United States Patent
Dusan et al.

(10) Patent No.: US 10,771,898 B2
(45) Date of Patent: Sep. 8, 2020

(54) LOCATING WIRELESS DEVICES

(71) Applicant: Apple Inc., Cupertino, CA (US)

(72) Inventors: Sorin V. Dusan, San Jose, CA (US);
Raghunandan K. Pai, Cupertino, CA (US); Scott Lopatin, San Francisco, CA (US); Tommy Rochette, San Jose, CA (US); Navin Bindiganavile Suparna, Cupertino, CA (US); Emmanuel Lalande, San Francisco, CA (US); Siva Ganesh Movva, Cupertino, CA (US); Robert Watson, Santa Clara, CA (US); Scott Grinker, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/721,666

(22) Filed: Sep. 29, 2017

(65) Prior Publication Data

US 2018/0199138 A1 Jul. 12, 2018

Related U.S. Application Data

(60) Provisional application No. 62/444,295, filed on Jan. 9, 2017.

(51) Int. Cl.
*H04R 5/033* (2006.01)
*H04M 1/60* (2006.01)
(Continued)

(52) U.S. Cl.
CPC ............ *H04R 5/0335* (2013.01); *G08B 1/08* (2013.01); *G08B 3/1016* (2013.01); *G08B 25/08* (2013.01);
(Continued)

(58) Field of Classification Search
CPC .... H04R 5/0335; H04R 1/1091; H04R 3/005; H04R 2499/11; H04W 4/02; H04W 64/006; G08B 1/08; G08B 3/1016; H04M 1/60
See application file for complete search history.

(56) References Cited

U.S. PATENT DOCUMENTS

| 8,457,617 B2 | 6/2013 | Sweeney et al. |
| 9,277,353 B2 | 3/2016 | Merriam |

(Continued)

FOREIGN PATENT DOCUMENTS

EP 1296155 3/2003

OTHER PUBLICATIONS

Lopez, Mareo; "The Importance of a Speaker's Resonant Frequency", proaudioland.com, 3 pages, Aug. 2015 (Year: 2015).*

(Continued)

*Primary Examiner* — Ping Lee
(74) *Attorney, Agent, or Firm* — Jaffery Watson Mendonsa & Hamilton LLP

(57) ABSTRACT

Systems, methods, devices and non-transitory, computer-readable storage mediums are disclosed for location-tracking wireless devices. In an embodiment, a method performed by an electronic device comprises: playing, or initiating the playing of, a sound through a loudspeaker of an accessory device via a communication link. The sound is played at a specified frequency that utilizes a frequency response of the loudspeaker (or loudspeaker plus speaker enclosure). The sound is received through two or more microphones of the electronic device and filtered by one or more filters. The one or more filters are configured to pass the sound at or around the specified frequency and to reduce masking of the sound by ambient noise. The filtered sound is associated with direction data generated from sensor data (Continued)

provided by one or more inertial sensors of the electronic device. In another embodiment, the specified frequency is higher than the maximum human hearing range.

20 Claims, 15 Drawing Sheets

(51) Int. Cl.
G08B 3/10 (2006.01)
H04W 64/00 (2009.01)
G08B 1/08 (2006.01)
H04W 4/02 (2018.01)
H04R 1/10 (2006.01)
G08B 25/10 (2006.01)
G08B 25/08 (2006.01)
H04R 3/00 (2006.01)

(52) U.S. Cl.
CPC .......... *G08B 25/10* (2013.01); *H04M 1/6008* (2013.01); *H04R 1/1091* (2013.01); *H04W 4/02* (2013.01); *H04W 64/006* (2013.01); *H04R 3/005* (2013.01); *H04R 2499/11* (2013.01)

(56) References Cited

U.S. PATENT DOCUMENTS

| | | | |
|---|---|---|---|
| 9,316,717 B2 | 4/2016 | Gicklhorn et al. | |
| 9,462,109 B1* | 10/2016 | Frazier Fields | H04M 1/6066 |
| 2007/0283395 A1* | 12/2007 | Wezowski | H04M 19/041 |
| | | | 725/81 |
| 2009/0058670 A1* | 3/2009 | Sweeney | G08B 21/023 |
| | | | 340/686.1 |
| 2013/0271902 A1* | 10/2013 | Lai | H04R 1/02 |
| | | | 361/679.01 |
| 2013/0275873 A1* | 10/2013 | Shaw | G01S 3/8006 |
| | | | 715/716 |
| 2015/0277852 A1* | 10/2015 | Burgis | H04W 4/00 |
| | | | 700/94 |
| 2015/0356030 A1 | 12/2015 | Zahand et al. | |
| 2015/0382140 A1 | 12/2015 | Cho et al. | |
| 2016/0212538 A1* | 7/2016 | Fullam | G06K 9/0057 |
| 2016/0360350 A1* | 12/2016 | Watson | H04W 4/70 |

OTHER PUBLICATIONS

Thetileapp.com [online], "Learn How Tile's Tracking Device Helps You Find Your Lost Things," Dec. 9, 2016, retrieved from URL <https://www.thetileapp.com/how-it-works>, 9 pages.

* cited by examiner

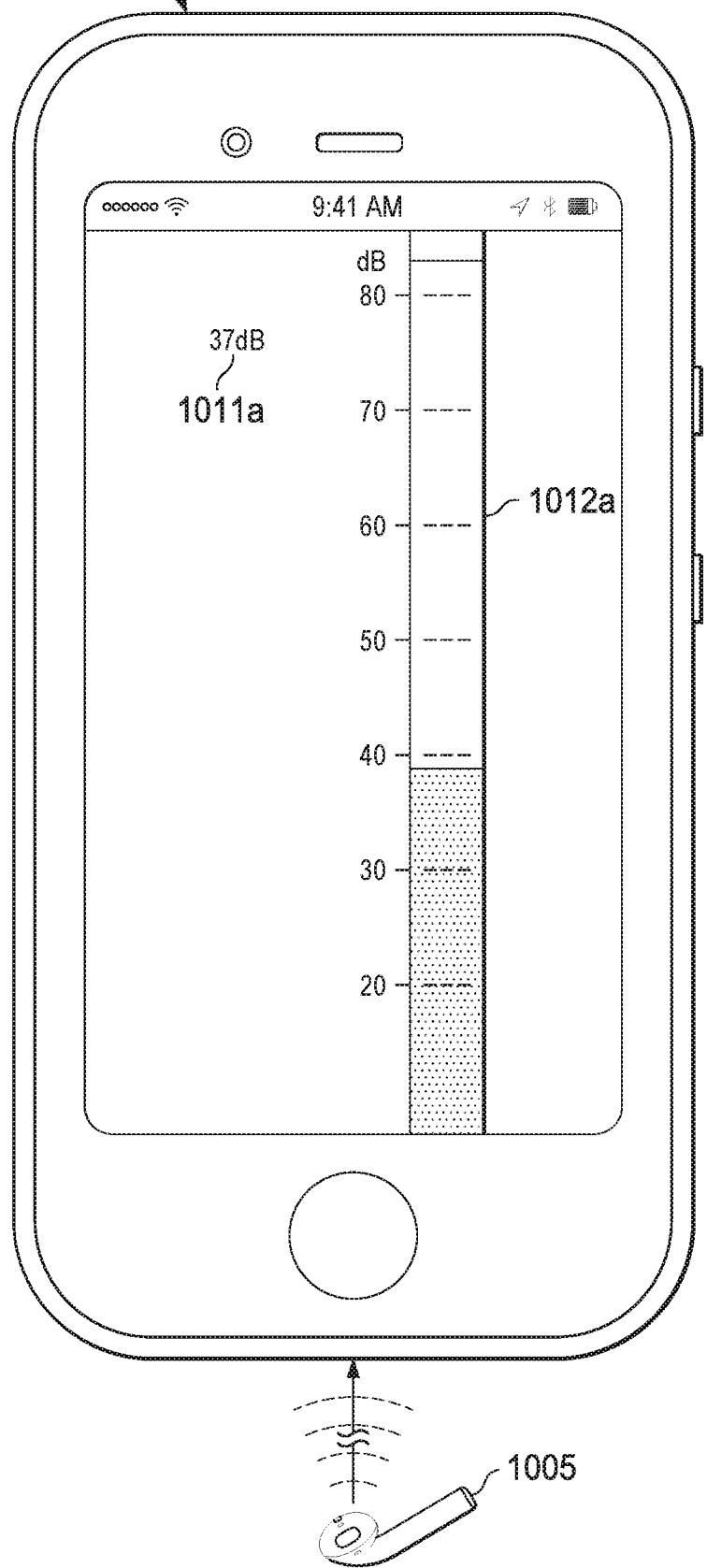

LOCATING WIRELESS DEVICES

CROSS-REFERENCE TO RELATED APPLICATION

This application claims priority to U.S. Provisional Patent Application No. 62/444,295, filed Jan. 9, 2017, the entire contents of which is incorporated herein by reference.

TECHNICAL FIELD

This disclosure relates generally to locating wireless devices that have been lost or stolen.

BACKGROUND

Wireless devices, such as smart phones and tablet computers, often include a client application that allows a user to access a network-based service for remote location-tracking of the mobile device after it has been lost or stolen. The user can invoke a "lost mode" remotely through a server computer using another computer or device to flag the device as lost or stolen. If the wireless device includes positioning technology, the device can be configured to report its last location to the server computer, which is displayed by the service on a map presented to the user.

Often wireless devices are used with wireless accessory devices that cannot determine their location and cannot communicate with a remote tracking services over a wide area network, such as the Internet. These accessory devices can include, for example, wireless earbuds, headphones, headsets and other wearable devices (e.g., smartwatches, fitness bands, optical head-mounted displays) that communicate directly with the wireless device using peer-to-peer communications. Sometimes a user misplaces a wireless accessory device and would like assistance in locating the wireless accessory device. The currently available remote location-tracking services, however, are unable to track lost or stolen accessory devices.

SUMMARY

Systems, methods, devices and non-transitory, computer-readable storage mediums are disclosed for locating wireless devices.

In an embodiment, a method performed by an electronic device comprises: playing, or initiating the playing of, a sound through a loudspeaker of an accessory device via a communication link. The sound is played at a specified frequency that utilizes a frequency response of the loudspeaker (or loudspeaker plus speaker enclosure). The sound is received through two or more microphones of the electronic device (configured for beamforming). A beamforming signal is generated from outputs of the two or more microphones, which is filtered by one or more filters. The one or more filters are configured to pass the sound at or around the specified frequency and to reduce masking of the sound by ambient noise. The filtered sound is associated with orientation data generated from sensor data provided by one or more inertial sensors of the electronic device. In another embodiment, the specified frequency is higher than the maximum human hearing range.

In an embodiment, a system comprises: one or more processors, memory operable to store instructions, which, when executed by the one or more processors, causes the one or more processors to perform operations comprising: playing, or initiating the playing of, a sound through a loudspeaker of an accessory device, the sound played at a specified frequency that utilizes a frequency response of the loudspeaker; receiving through two or more microphones, the sound played by the loudspeaker, generating a beamforming signal from outputs of the two or more microphones; filtering, by one or more filters, the beamforming signal, the one or more filters configured to pass the sound at or around the specified frequency and to reduce masking of the sound by ambient noise; and associating the filtered sound with a compass heading for the electronic device generated from sensor data provided by one or more inertial sensors.

In an embodiment, a non-transitory, computer-readable storage medium having instructions stored thereon causes one or more processors to perform operations comprising: playing, or initiating the playing of, a sound through a loudspeaker of an accessory device, the sound played at a specified frequency that utilizes a frequency response of the loudspeaker; receiving through two or more microphones, the sound played by the loudspeaker; generating a beamforming signal from outputs of the two or more microphones; filtering, by one or more filters, the beamforming signal, the one or more filters configured to pass the sound at or around the specified frequency and to reduce masking of the sound by ambient noise; and associating, by the electronic device, the filtered sound with a compass heading generated from sensor data provided by one or more inertial sensors.

In an embodiment, an electronic device comprises: two or more microphones; one or more inertial sensors; a wireless communications interface; one or more processors; memory operable to store instructions, which, when executed by the one or more processors, causes the one or more processors to perform operations comprising: playing, or initiating the playing of, a sound through a loudspeaker of an accessory device, the accessory device communicatively coupled to the electronic device through the wireless communication interface, the sound played at a specified frequency that utilizes a frequency response of the loudspeaker; receiving, by the electronic device through the two or more microphones of the electronic device, the sound played by the loudspeaker; generating a beamforming signal from outputs of the two or more microphones; filtering, by one or more filters, the beamforming signal, the one or more filters configured to pass the sound at or around the specified frequency and to reduce masking of the sound by ambient noise; and associating the filtered sound with an orientation of the electronic device generated from sensor data provided by the one or more inertial sensors.

In an embodiment, a method comprises: causing, by an electronic device, a graphical user interface (GUI) to be displayed on a display of the electronic device, the GUI including a first graphical element indicating a first sound pressure level associated with a first orientation of the electronic device in a reference coordinate system, wherein at least one dimension of the first graphical element in the GUI is determined at least in part by the first sound pressure level; and causing, by the electronic device, a second graphical element to be displayed in the GUI, the second graphical element indicating a second sound pressure level that is different than the first sound pressure level, the second sound pressure level associated with a second orientation of the electronic device in the reference coordinate system, wherein at least one dimension of the second graphical element in the GUI is determined at least in part by the second sound pressure level.

Particular implementations disclosed herein provide one or more of the following advantages. Users are provided with assistance in locating a lost or stolen wireless accessory device by playing, or initiate playing of, a sound through a loudspeaker of the wireless accessory device at a specified frequency during a sound playing mode. The playing can be initiated by another electronic device in the user's possession (hereinafter referred to as a "companion device") that is communicatively coupled to the wireless accessory device directly or indirectly through a communication link. The specified frequency can be the resonant frequency of the loudspeaker (or the loudspeaker and a speaker enclosure) to enable the sound to be more easily heard by the user and detected by the companion device in an environment with ambient noise. One or more narrow band filters can be tuned to pass the resonant frequency and to attenuate other frequencies.

In an embodiment, the user of a companion device is assisted in locating the accessory device by a sound locator graphical user interface (GUI) that is displayed on the companion device that indicates a direction of the sound source using sound pressure level (SPL) measurements and direction data (e.g., heading data) provided by, or calculated from, inertial sensor data (e.g., gyroscope data, magnetometer data). In an embodiment, radio frequency (RF) data, such as received signal strength indicator (RSSI) values provided by a wireless communications interface of the companion device are also used to update the sound locator GUI. In an embodiment, spatial signal processing (e.g., a beamforming) can be used to direct the gain of two or more microphones of the companion device in a preferred direction to improve detection of the sound by the companion device and to attenuate ambient noise from the environment.

In an embodiment, a microphone of the wireless accessory device can be turned on in a listening mode to allow the user to hear the ambient sounds of the environment where the accessory device is located and leverage their knowledge of the environment to determine where the accessory device may be located. The listening mode can be time multiplexed with the sound playing mode to allow alternating between listening to the played sound on the lost device and listening to the ambient sounds of the environment.

The details of the disclosed implementations are set forth in the accompanying drawings and the description below. Other features, objects and advantages are apparent from the description, drawings and claims.

DESCRIPTION OF DRAWINGS

FIG. 10E illustrates a fifth GUI of a companion device for locating a wireless accessory device, including a sound GUI with the beamformer of the companion device oriented in the opposite direction of the wireless accessory device, according to an embodiment.

The same reference symbol used in various drawings indicates like elements.

DETAILED DESCRIPTION

Example Systems

Figure 1:
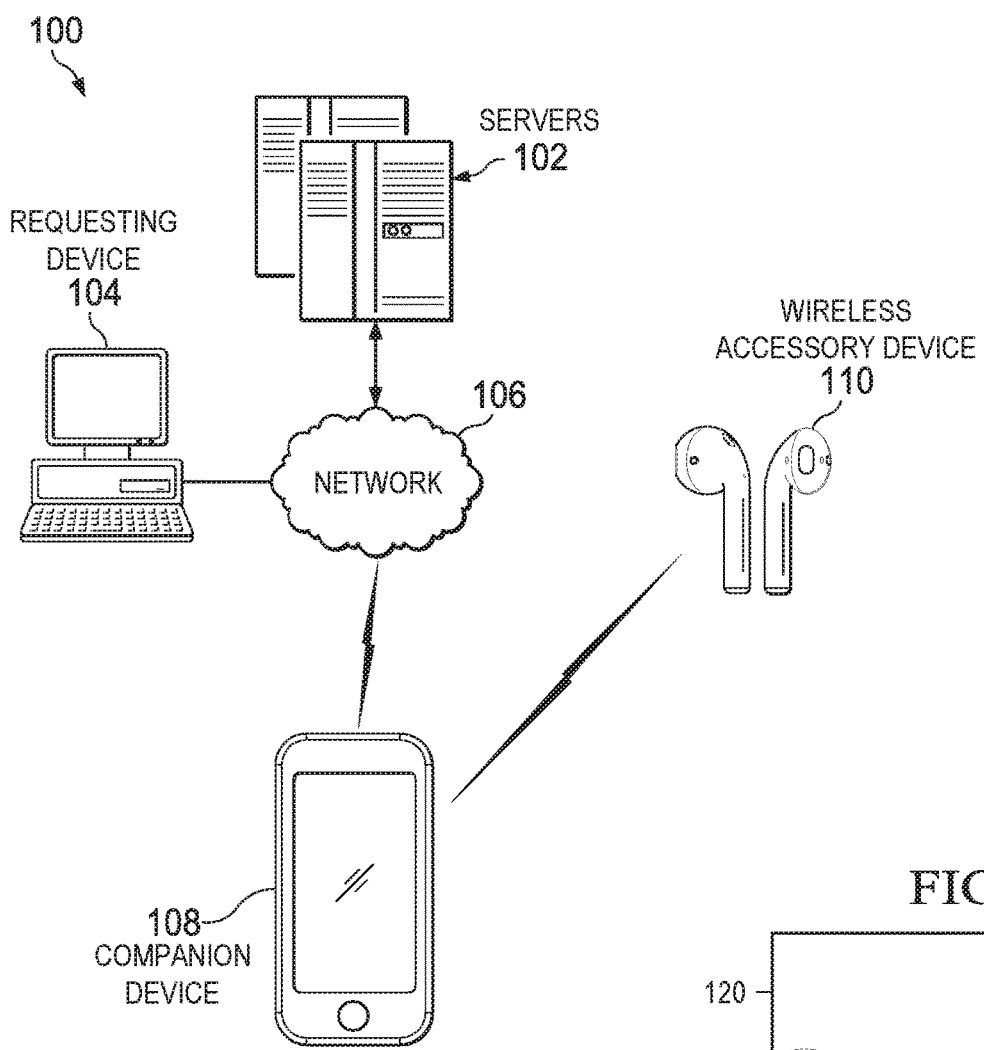
FIG. 1 is a block diagram of a system for locating a wireless accessory device, according to an embodiment.

FIG. 1 is a block diagram of a system for locating a wireless accessory device, according to an embodiment. System 100 includes one or more server computers 102, requesting device 104, network 106, companion device 108 and wireless accessory device 110. Server computer(s) 102 can be configured to provide a network-based device locator service. In an embodiment, server computer(s) 102 implement a website that allows a user of a requesting device 104 to configure a lost mode on a wireless device.

Requesting device 104 can be any electronic device or computer with network connectivity, including but not limited to: desktop computers, laptop computers, smartphones, tablet computers, wearable devices and the like. In an embodiment, requesting device 104 is also companion device 108 and can assist the user in finding their lost wireless accessory device, as described in further detail below.

Wireless accessory device 110 can be any device that communicates either directly or indirectly (e.g., through another device or computer) with a companion device over a wireless network or peer-to-peer communication link. Some examples of wireless accessory devices include but are not limited to wireless earbuds, headphones, headsets and other wearable devices (e.g., smartwatches, fitness bands, optical head-mounted displays, game controllers, remote controls, smartphones). In an embodiment, wireless accessory device 110 can be "paired" with companion device 108 according to, for example, a wireless technology standard, such as Bluetooth.

Some examples of wireless networks include a wireless local area network (WLAN), such as the Internet, and a wireless personal area network (WPAN). Some examples of communication technologies include any suitable IEEE 802.xx technology, including but not limited to Wi-Fi and Bluetooth.

Companion device 108 can be any electronic device capable of communicating with a wireless accessory device (e.g., a device that includes a wireless transceiver chip), and that includes at least one microphone, or other sound transducer, and a display or other output device (e.g., an audio output device) for assisting a user in locating a wireless accessory device. Some examples of a companion device include but are not limited to: a smartphone, a tablet computer, a notebook computer, a wearable computer (e.g., a smartwatch) and the like.

In operation, a user logs into a device locator service on server computer(s) 102 using requesting device 104. The user is presented with a GUI which allows the user to locate a lost or stolen accessory device 110 on a map. For example, the GUI could present the map with a marker showing the location of the wireless accessory device. The device locator service establishes communication through network 106 with companion device 108. Companion device 108 includes one or more positioning technologies, such as a global navigation satellite system (GNSS) receiver chip or a terrestrial positioning system using RF signals from access points (APs) of a wireless network or cell tower transmitters of a cellular telephone network. An example GNSS system is the Global Positioning System (GPS). In an embodiment, companion device 108 periodically stores its own location. When the device locator service requests the location of wireless accessory device 110, companion device 108 determines if there is an operational communication link with wireless accessory device 110. For example, if the communication link is a Bluetooth communication link, companion device 108 determines if companion device 108 is currently "paired" (e.g., in wireless communication) with wireless accessory device 110. If so, then companion device 108 returns its current location as the location of accessory device 110. If, however, there is no operational communication link with accessory device 110, companion device 108 returns the location that corresponds to a time when connectivity with accessory device 110 was lost or the location that corresponds to a time when accessory device 110 was last connected or used. For example, each time connectively is lost with accessory device 110 (a disconnect event), companion device 108 stores its current location in memory. In an embodiment, a history of locations and times of disconnect events can be stored by companion device 108. In other embodiments, only a current location of companion device 108 at the time of the last disconnect event is stored.

In an embodiment, when user initiates on a companion device or requesting device a sound to be played on an accessory device, some or all of the companion devices that were previously connected to the accessory device (e.g., through a Bluetooth or other connection) are sent a notification from the server computer that includes a pending play sound command. For example, a push notification or other Internet-based communication can be sent to the companion devices, where the command is initiated by a central server computer.

When the companion devices receive the pending play sound command, the companion devices each scan (e.g., using Bluetooth) to find the accessory device over a period of time. If the accessory device is found by a companion device, the companion device will contact the server computer to determine if the sound still needs to be played on the accessory device. If the sound still needs to be played, the companion device will establish a connection with the accessory device (e.g., using Bluetooth) and play the sound on the accessory device or invoke the accessory device to play the sound. When the accessory device starts playing the sound, all of the companion devices that were once connected to the accessory device will receive notifications that will cause a message or other indicator to be displayed on each companion device (e.g., on the lock screen), informing the user that the sound is playing on the accessory device. The user can then stop the sound using a graphical element provided by or presented in the notification, or invoke a device locator client application to view the location of the accessory device on a map and/or mute or stop the sound from playing on the accessory device, as described in reference to FIGS. 10B and 10C.

In another embodiment, one or more of received signal strength values (e.g., RSSI values) (or average RSSI values), estimated ranges or range classes (e.g., Nearby, Far) that are measured or calculated on the companion devices are sent to the server computer periodically or in response to a trigger event. The server computer can then compare these proximity values to determine which companion device is closest to the accessory device. The server computer can then send the play sound command only to that companion device or a subset of companion devices that are within a specified proximity of the accessory device.

Although system 100 can show a user the location of wireless accessory device 110 on a map, it is also desirable to locally assist the user who is operating companion device 108 to find wireless accessory device 110. This can be accomplished using a sound locator application running on companion device 108 that can play a sound, or initiate the playing of a sound, on a loudspeaker of wireless accessory device 110, and then determine the location of wireless accessory device 110 in the local environment based on the sound received through one or more microphones of companion device 108, direction data (e.g., compass heading data) and optionally RF data, which is described in further detail below in reference to FIGS. 2-10.

Figure 3:
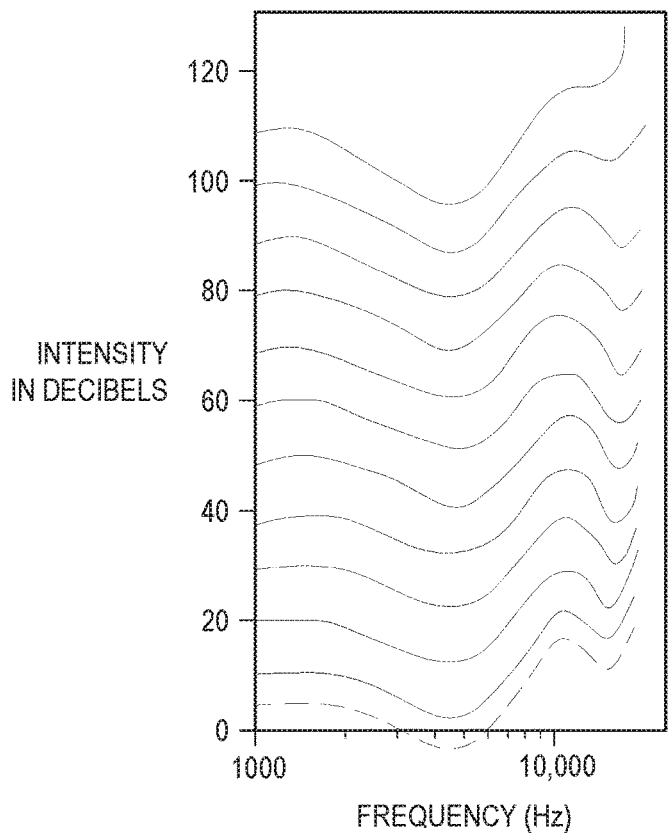
FIG. 3 illustrates human ear sensitivity as a function of frequency and intensity, according to an embodiment.
Figure 2:
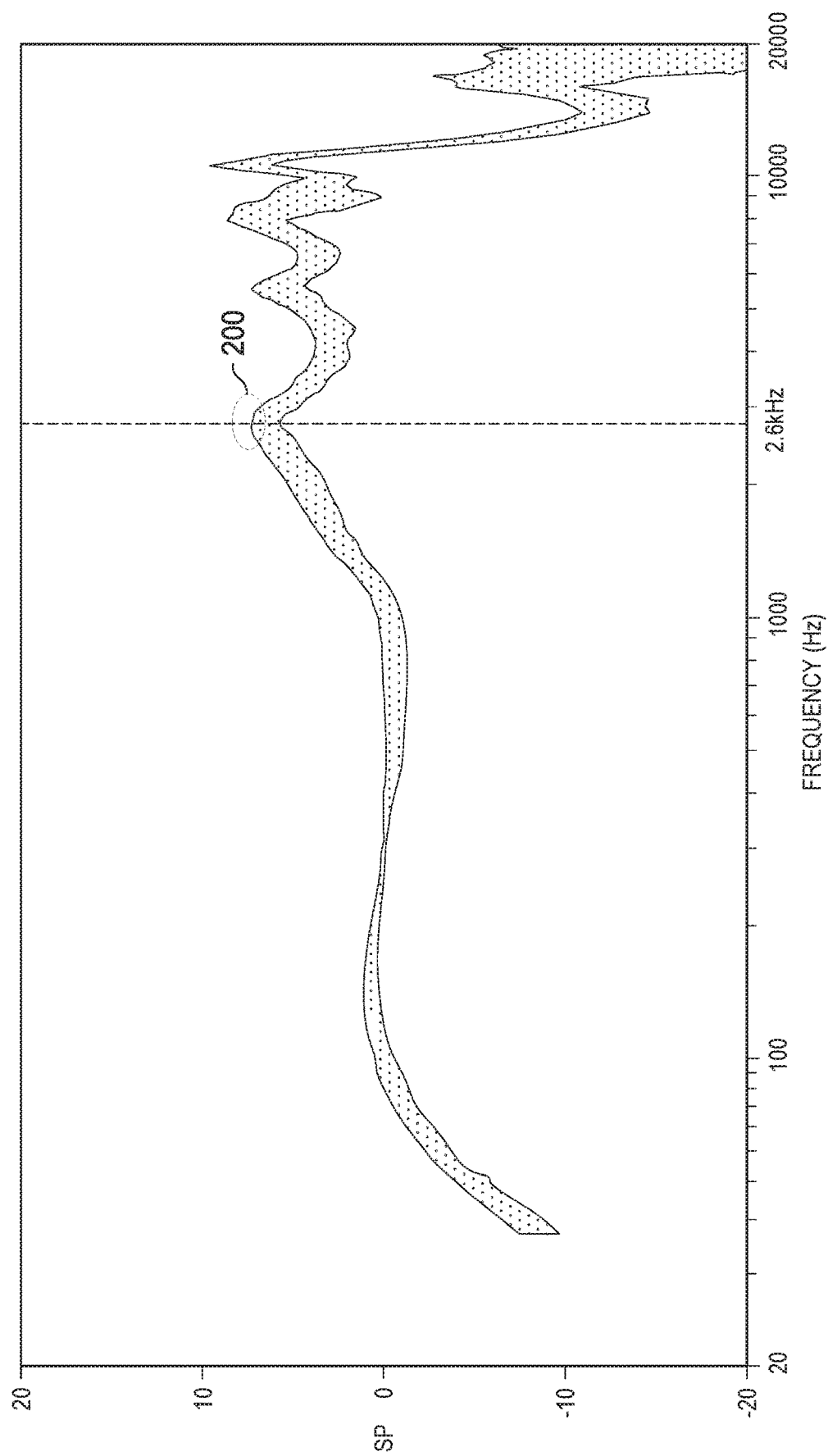
FIG. 2 illustrates a frequency response of an example loudspeaker of an example wireless accessory device, according to an embodiment.

FIG. 2 illustrates a frequency response of an example loudspeaker of an example accessory device, according to an embodiment. The shaded region represents a population of frequency response curves. As shown in FIG. 2, this example loudspeaker has a first peak 200 in the frequency response at about 2.6 kHz. As shown in FIG. 3, 2.6 kHz is close to the maximum sensitivity range of the human ear, which is about 3-4 kHz. Human hearing does not have a flat spectral sensitivity or frequency response relative to frequency versus amplitude. For example, humans do not perceive low and high frequency sounds as well as sounds between 3-4 kHz, as shown by the equal-loudness contours in FIG. 3.

To ensure efficient power transfer to the loudspeaker in the accessory device, the companion device can stream an audio signal at about 2.6 kHz over the direct communication link (e.g., over a Bluetooth link). A wireless communications interface (e.g., a wireless transceiver chip) in the accessory device can receive and decode (if encoded) the audio signal and an audio processing unit in the accessory device can play the decoded audio signal through a loudspeaker. The sound can be a tone or a pattern of tones at the desired frequency. By playing a tone at or close to the resonant frequency of the loudspeaker, maximum loudness can be achieved to assist the user or the companion device in detecting the sound in an environment with ambient noise, such as a bar or restaurant. Additionally, matching the sound frequency with the frequency response of the loudspeaker is efficient in that less power will be needed to play the sound at maximum loudness. Reducing power loss allows the sound to be played at a sustained maximum loudness over a longer period of time than if played at another frequency, thus providing the user more time to locate the accessory device. This is beneficial in that a battery-powered accessory device may be low in power at the time of loss.

In an alternative embodiment, the frequency of the sound can be set higher than the maximum human hearing range, for example, at about 20.5 kHz. Playing the sound at an ultrasonic frequency eliminates the possibility of annoying the user if the accessory device is in the user's ear when the sound is played at maximum volume.

Figure 4:
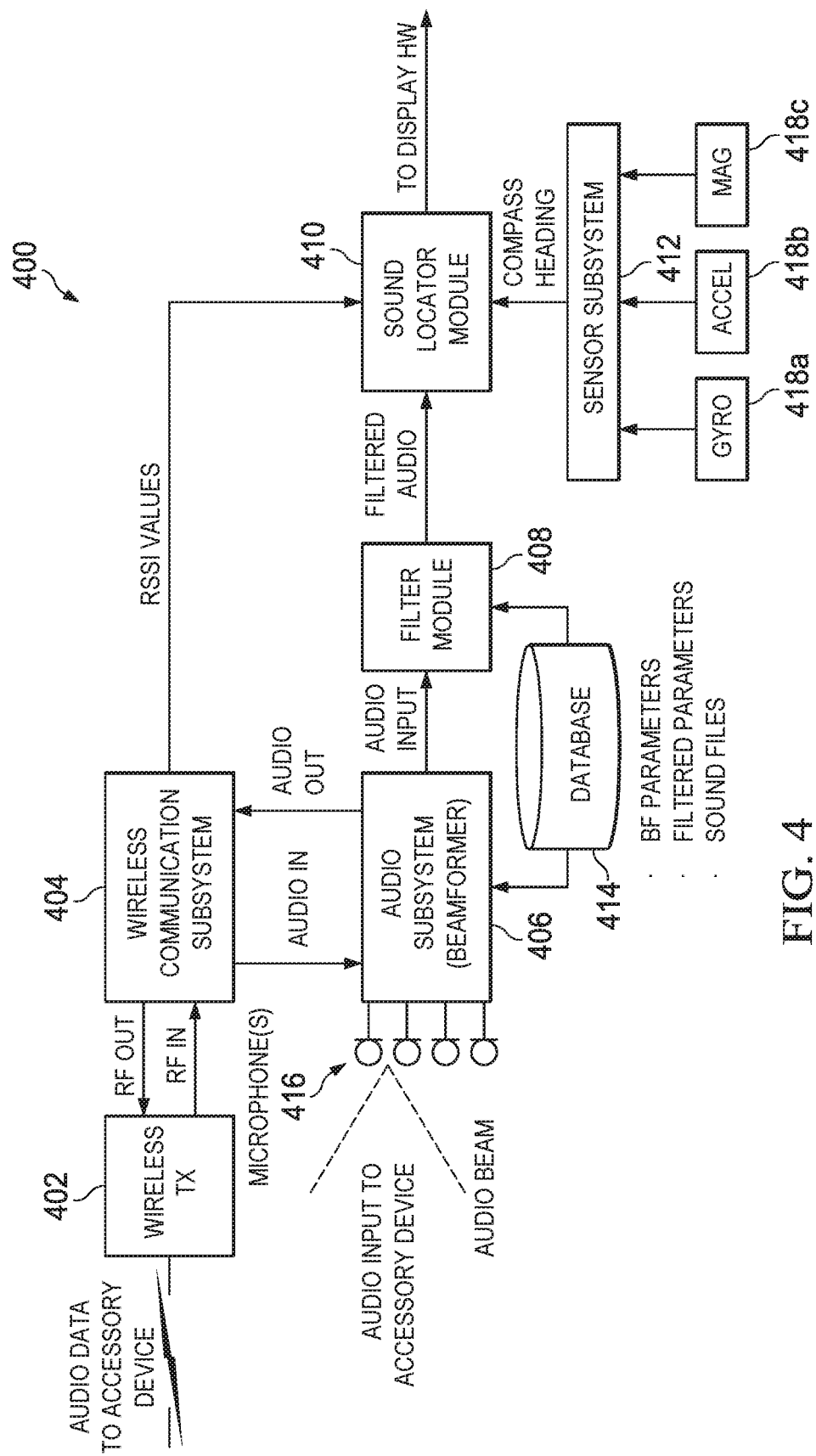
FIG. 4 is a block diagram of system for locating a wireless accessory device, according to an embodiment.

FIG. 4 is a block diagram of system for locating a wireless accessory device, according to an embodiment. System 400 can be implemented on a companion device in software, firmware, hardware or any combination thereof. For example, system 400 can be implemented using the example companion device architecture, described in reference to FIG. 12. System 400 can include wireless transceiver 402 and communication subsystem 404 (collectively, a wireless communication interface), audio subsystem 406 (including the beamformer), filter module 408, sound locator module 410, sensor subsystem 412, database 414 and microphone(s) 416. System 100 is an example system and other embodiments can include more or fewer subsystems. Although the subsystems in FIG. 4 are shown as separate blocks, in some embodiments, two or more subsystems can be combined into a single subsystem and any individual subsystem can be divided into additional subsystems depending on the particular application or companion device architecture.

Audio subsystem 406 can be implemented by an audio processing unit to select a suitable sound file from database 414 for playback on an accessory device. In an embodiment, the sound file can be predetermined and stored on the companion device or accessory device. The sound file can be a generic sound file associated with a particular loudspeaker model or can be a customized audio file for a specific loudspeaker. In an embodiment, when a companion device "pairs" or otherwise is in communication with an accessory device, the accessory device can provide a device profile that includes information about the accessory device, such as the type of loudspeaker that is installed. Audio subsystem 406 can then use this loudspeaker information to select a sound file that has a tone or tone pattern to be played at or near the resonant frequency of the loudspeaker, or the loudspeaker and its enclosure which may also influence the resonant frequency. In an embodiment, database 414 can store a number of generic sound files for different loudspeaker models. For example, a generic sound file can include a tone or pattern of tones designed for an average resonant frequency for the loudspeaker model or accessory device (loudspeaker plus enclosure) as determined by testing over a number of devices of a particular model. In another embodiment, communication subsystem 404 can obtain a suitable audio file from a server computer (e.g., server computer(s) 102) through wireless transceiver (TX) 402. This latter example embodiment would allow each individual loudspeaker to have a customized sound file that can be determined during factory testing and stored in a network database, which can be accessed by the companion device.

After a suitable sound file is obtained, the sound file is sent to communication subsystem 404, which formats and streams the sound file to the accessory device, where the sound file is received and played by a processor of the accessory device through a loudspeaker of the accessory device. In another embodiment, the sound file can be stored in memory of the accessory device or generated by the accessory device. In such an embodiment, audio subsystem 406 can generate a signal or command that is sent to the accessory device through a direct or indirect communication link. The signal or command is configured to cause the processor of the accessory device to play the sound file through the loudspeaker. An example wireless accessory device architecture is described in reference to FIG. 13.

The sound that is played by the wireless accessory device is received by one or more microphones 416 coupled to audio subsystem 406. In an embodiment, audio subsystem 406 can configure the two or more microphones for beamforming (BF), or use an embedded directional microphone (e.g., a cardioid microphone). Beamforming applies spatial filtering as a means to receive sound preferentially in a direction of interest. Beamforming is used to increase the signal-to-noise (SNR) ratio of the detected sound signal by attenuating ambient noise outside the direction of interest. In an embodiment, two microphones 416 located on a front or top edge of the companion device are configured to have a cardioid beam pattern to implement beamforming. For example, the main lobe of the beam pattern is projected in front of the user as she walks towards the accessory device.

In an embodiment, audio subsystem 406 monitors ambient sound from the environment for specified period of time (e.g., 5 seconds) to calculate a benchmark average sound pressure level ($SPL_R$). $SPL_R$ is defined as the RMS value of the instantaneous sound pressures measured over a specified period of time in decibels (dB). The ambient sound can be monitored with the two beamforming microphones or other microphones located elsewhere on the companion device. After calibration is complete, the sound is output to filter module 408 which filters the sound to reduce the masking effect of the ambient noise and increase the detectability of the sound. For example, a band-pass filter (BPF) centered around the resonant frequency of the loudspeaker (e.g., a passband centered around 2.60 kHz) can be applied to the sound signal. The frequency of 2.6 kHz is only an example frequency and each loudspeaker and accessory device or pair of wireless accessory devices (e.g., a pair of earbuds) will have their own frequency response which could have a resonant frequency that is higher or lower than 2.6 kHz. In general, the frequency of the sound should be at or near the resonant frequency of the loudspeaker to maximize loudness and efficient use of power to provide the maximum loudness. In an embodiment, two consecutive narrow band-pass filters are applied to the received sound signal. The first filter allows frequencies between about 2.5 kHz and about 2.7 kHz to pass. The second filter attenuates ambient noise even more to obtain a clear 2.6 kHz signal. Parameters for the filter characteristics can be stored in database 414 as part of an accessory device profile or obtained from a server computer.

Next, a normalized $SPL_N$ is calculated based on the benchmark average $SPL_R$ level using, for example, Equation [1]:

$$SPL_N = 20\log_{10}\left(\frac{P}{P_0}\right) \text{ dB}, \quad\quad\quad [1]$$

where P is the root-mean-square (RMS) value corresponding to the current sound pressure and $P_O$ is the RMS of the benchmark average $SPL_R$.

The normalized $SPL_N$ value is used to display sound strength indicators in a sound locator GUI, as described below and in reference to FIG. 10D. The normalized $SPL_N$ value is provided to sound locator module 410, which generates and updates the sound locator GUI.

The sound locator module 410 associates the normalized $SPL_N$ value with a direction (e.g., a heading in degrees) obtained from sensor subsystem 412. Sensor subsystem 412 is coupled to one or more inertial sensors, including but not limited to gyroscope 418a, accelerometers 418b and magnetometer 418c. Sensor subsystem 412 obtains (e.g., samples) raw sensor data from the one or more inertial sensors, optionally processes the sensor data (e.g., low pass filters and averages the sensor data) and calculates direction data from the raw sensor data. For example, sensor subsystem 412 can calculate a compass heading for the companion device from the raw or processed sensor data. As the user moves around the environment (or moves their arm) and walks towards the accessory device (the sound source), the sound locator GUI is updated according to new sensor data and new $SPL_N$ values. The sound locator GUI can be updated at a specified refresh rate (e.g., 60 Hz). As described in reference to FIG. 10D, the sound locator GUI can be implemented as virtual compass with a rotating plate and $SPL_N$ bars for assisting the user to locate the sound source (i.e., the wireless accessory device).

In an embodiment, in addition to normalized $SPL_N$ values the communication subsystem 404 calculates RSSI values from received RF signals transmitted by the accessory device (e.g., Bluetooth signals). The RSSI values provide a sense of proximity of the companion device to the accessory device. The proximity can be displayed on the companion device according to range classes. In an embodiment, the range classes include but are not limited to: "Nearby," "In the Room," "In the house" and "Far." Other range classes are also possible. For example, range classes that refer to distance can be used (e.g., 5 m, 10 m, 15 m and 20 m). In an embodiment, the range classes can be calculated from a radio wave distance formula or statistically using, for example, a probability density function (PDF) and/or cumulative distribution function (CDF) of RSSI values. For example, windowed signal measurements obtained from RF signals transmitted by the accessory device can be classified into range classes that are defined by threshold values obtained from a RF signal propagation model. A range class observation is then obtained by selecting a range class among a plurality of range classes based on a percentage of a total number of windowed signal measurements that are associated with the range class. The range class observation is then provided as input to a state estimator that estimates a range class that accounts for process and/or measurement noise.

Using the range classes (rather than absolute range determination) helps mitigate problems associated with Bluetooth proximity detection in multipath environments. Presenting the range classes to the user informs the user that they are getting closer or further from the sound source. Range classes can be displayed or can be indicated by an audio sound or haptic feedback as a function of range class. For example, a sound pattern can be played on a loudspeaker of the companion device with increasing volume and/or frequency as a function of range class or a vibration pattern can be induced by a haptic engine of the companion device with increasing frequency as a function of range class.

Figure 10A:
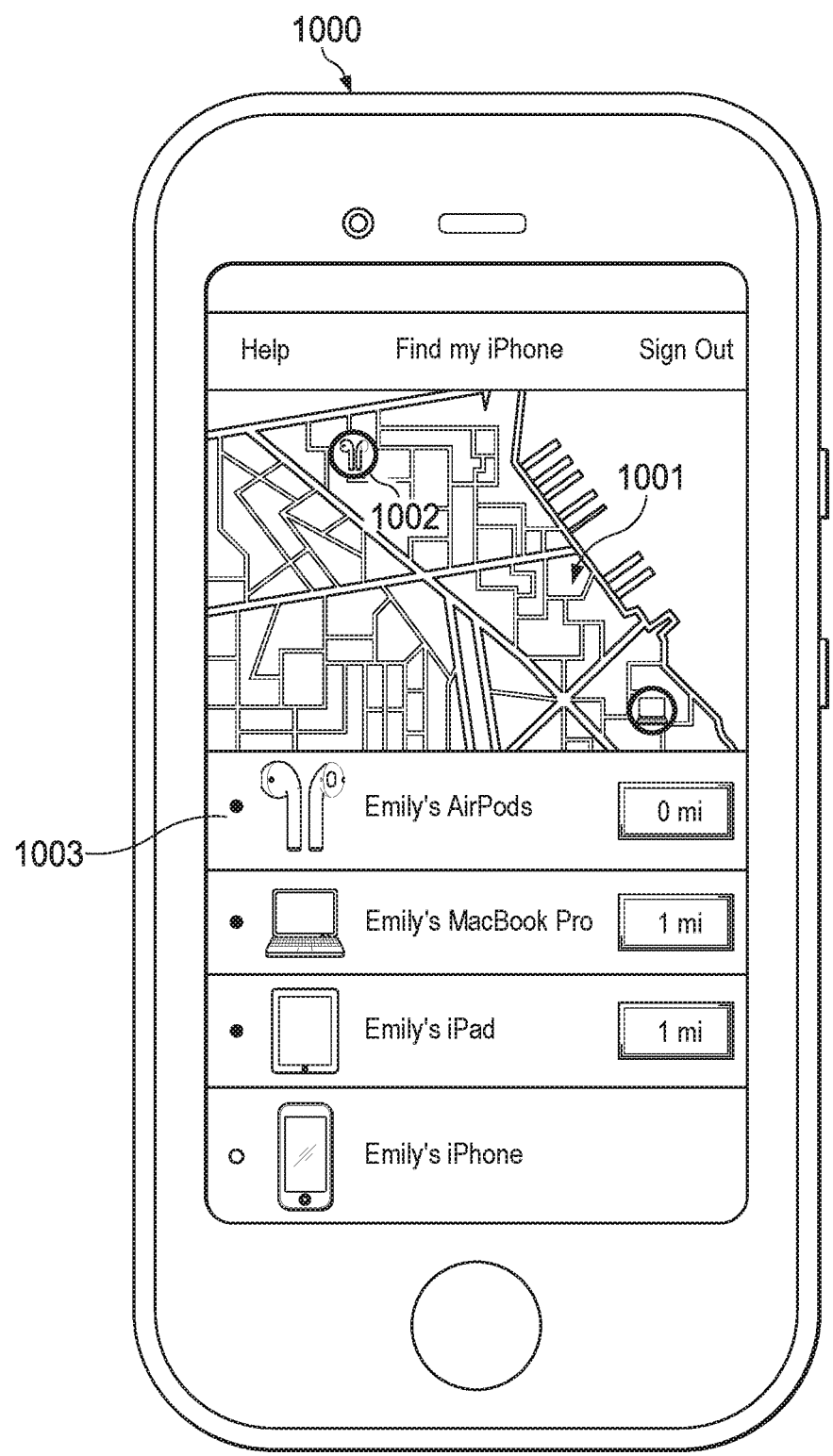
FIG. 10A illustrates a first GUI of a companion device for locating a wireless accessory device on a map, according to an embodiment.
Figure 10B:
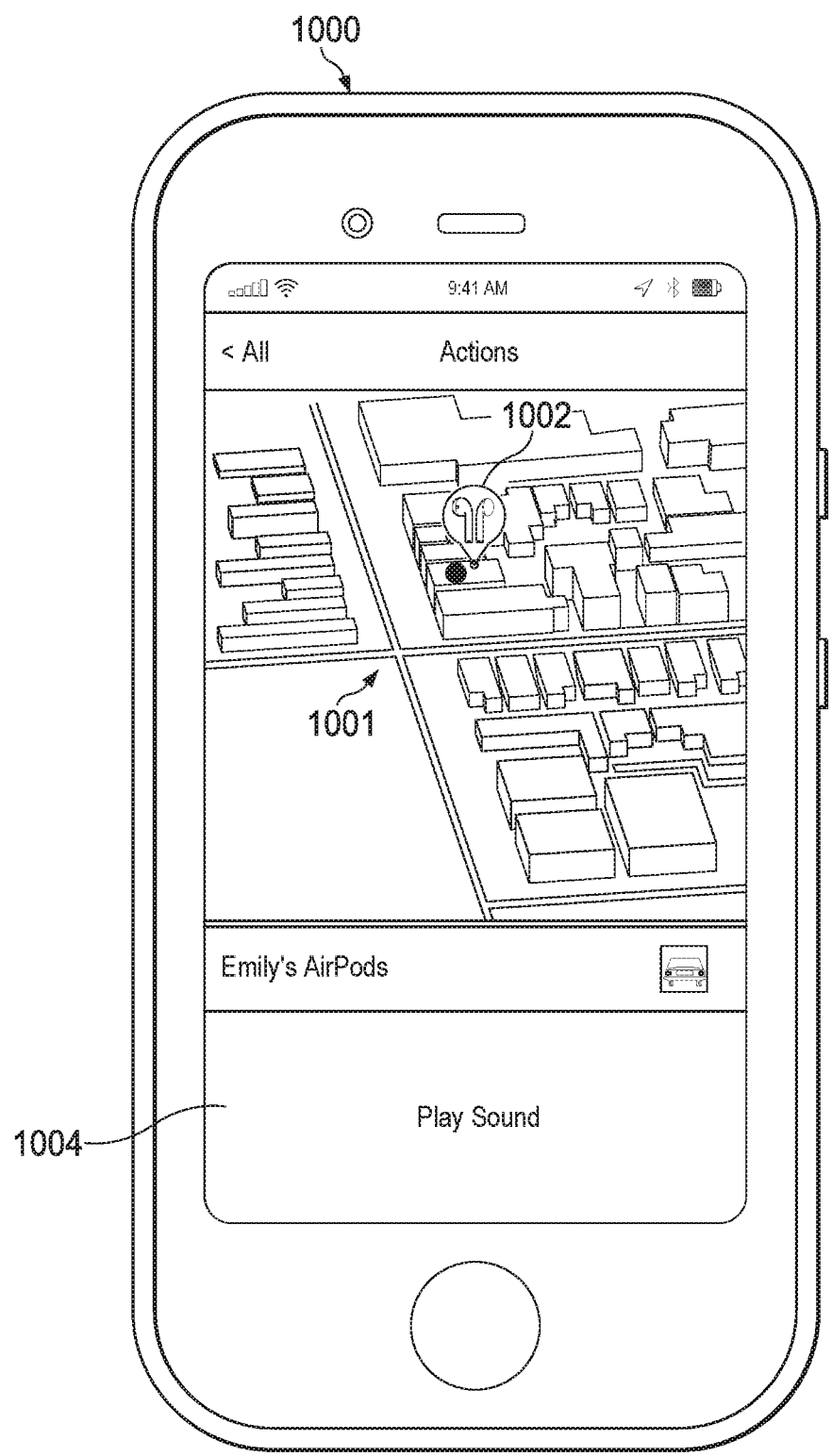
FIG. 10B illustrates a second GUI of a companion device for locating a wireless accessory device and initiating a sound playing mode, according to an embodiment.
Figure 10C:
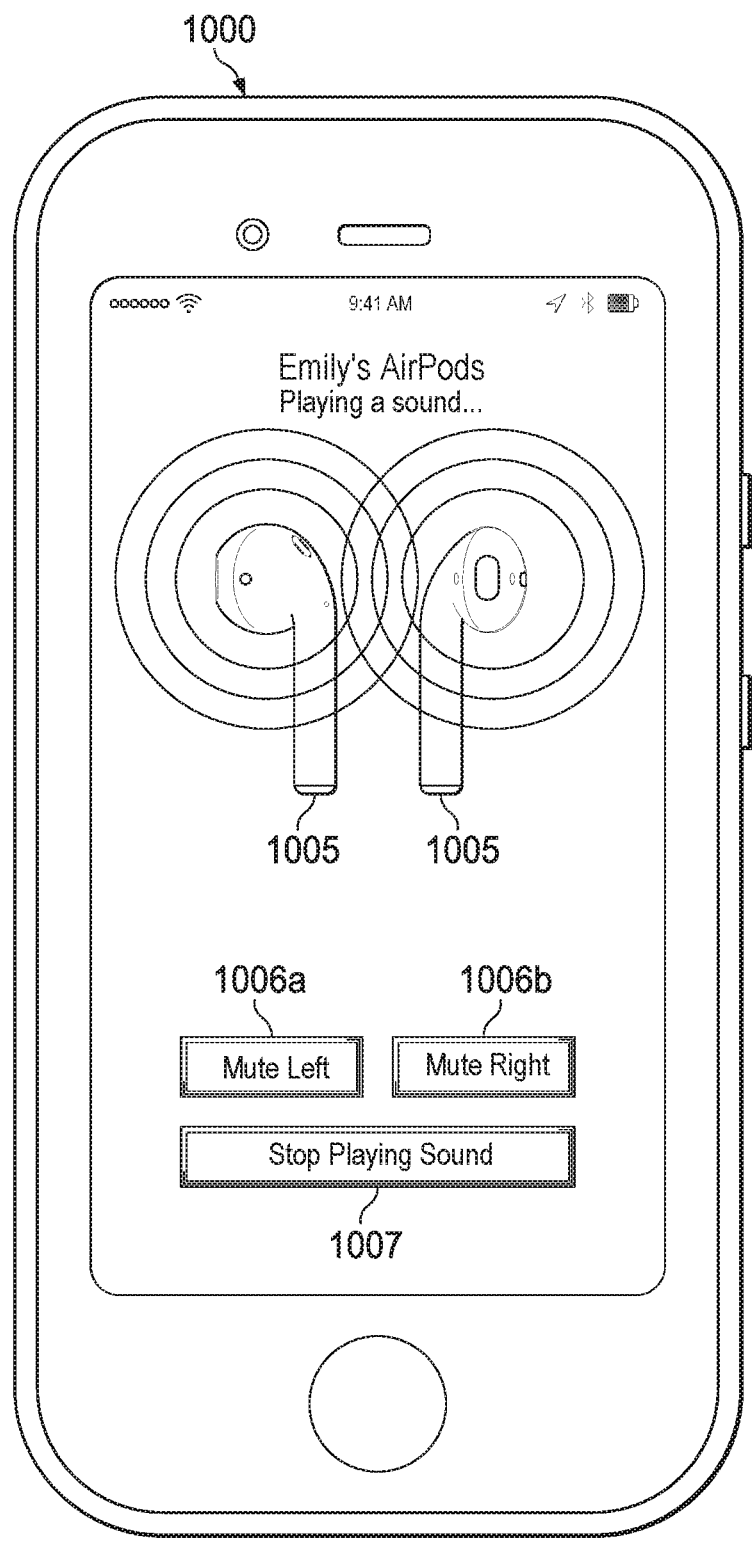
FIG. 10C illustrates a third GUI of a companion device for locating a wireless accessory device, including a feature for independently muting left and right loudspeakers of the wireless accessory device, according to an embodiment.
Figure 10D:
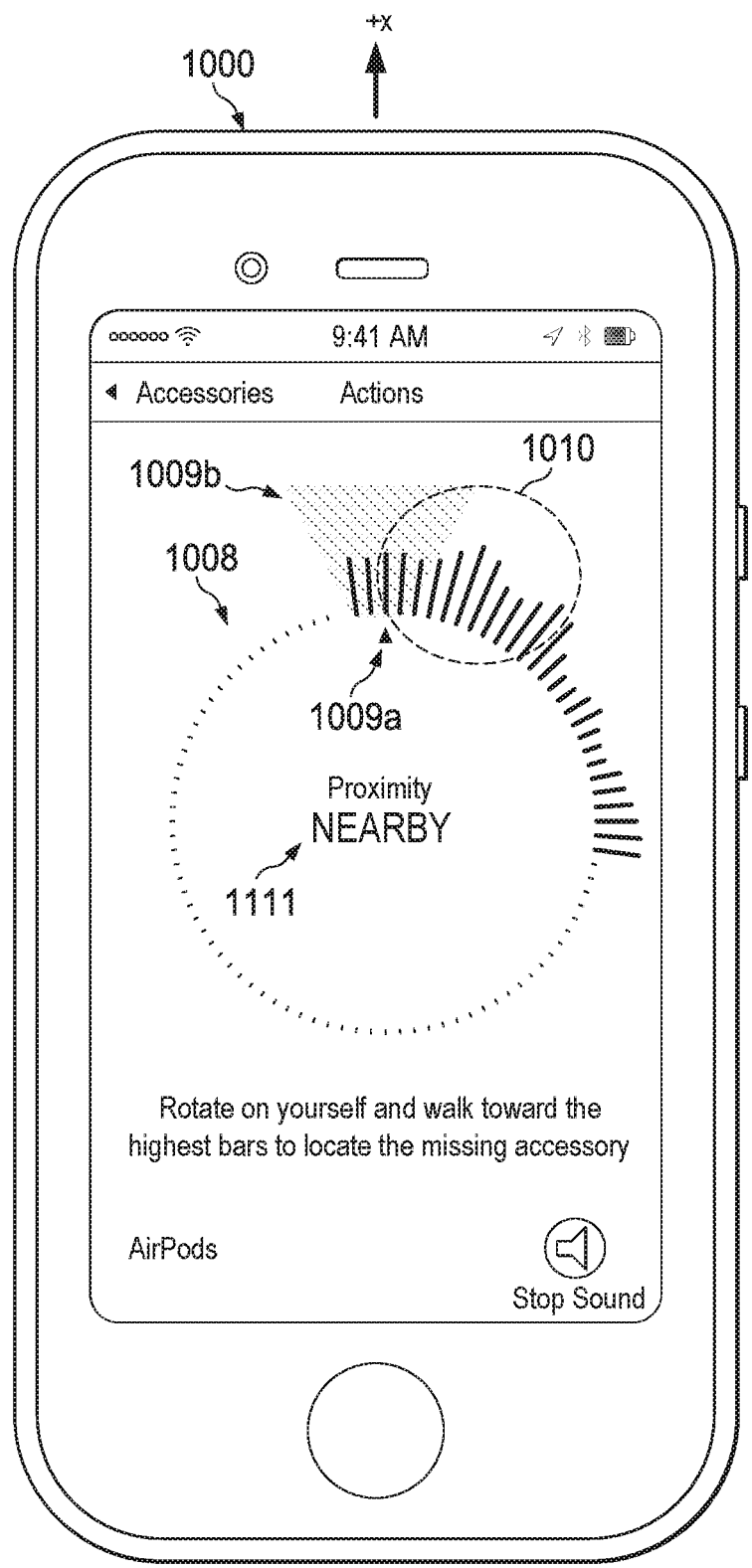
FIG. 10D illustrates a fourth GUI of a companion device for locating a wireless accessory device, including a sound locator GUI, according to an embodiment.

Additionally, the RSSI values can be provided to sound locator module 410 for use in updating the GUI to influence how the normalized $SPL_N$ values are displayed, as described further in reference to FIG. 10D.

Figure 5:
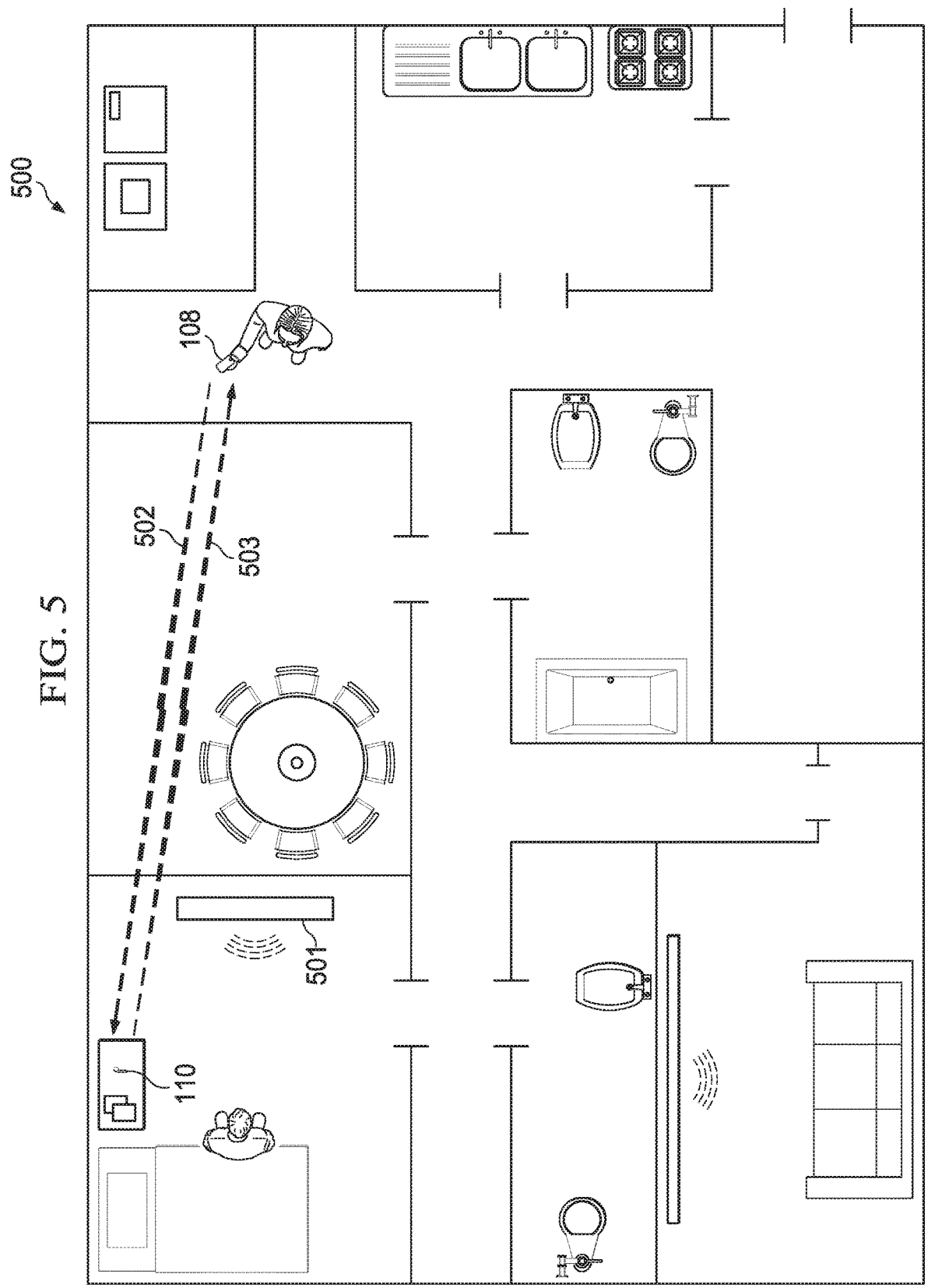
FIG. 5 illustrates an example use case where a user loses her wireless earbud in her home and then uses her smartphone to locate the earbud, according to an embodiment.

FIG. 5 illustrates an example use case where a user (Emily) loses her earbud in her home and then uses her smartphone to locate the lost earbud, according to an embodiment. FIG. 5 shows a floorplan 500 of a house. Emily's lost earbud 110 is in Room 2. There is also ambient noise in Room 2 due to television 501. Emily is in another room and is carrying her smartphone 108 in her hand while viewing a sound locator GUI to find her lost earbud 110, as previously described. Dashed line 502 indicates a wireless transmission from smartphone 108 to earbud 110 and dashed line 503 indicates a wireless transmission from earbud 110 to smartphone 108. Example process steps that can be implemented by smartphone 108 to assist Emily 501 in finding earbud 110 will now be described in reference to FIGS. 6-9.

Example Processes

Figure 6:
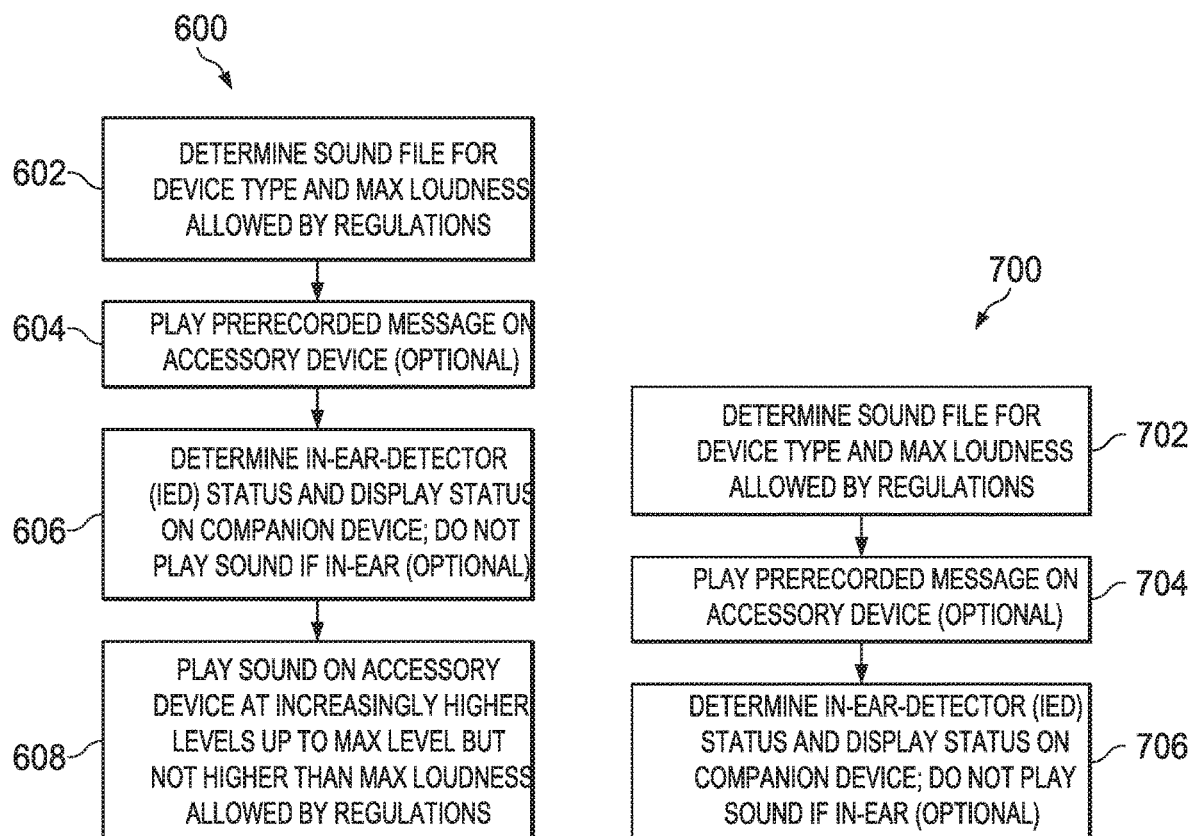
FIG. 6 is a flow diagram of a first process for locating a wireless accessory device, according to an embodiment.

FIG. 6 is a flow diagram of a first process 600 for locating a wireless accessory device, according to an embodiment. Process 600 can be implemented using, for example, companion device architecture 1200 described in reference to FIG. 12.

Process 600 can begin by determining a sound file for Emily's earbud and a maximum loudness allowed by local regulations (602). For example, the companion device can refer to a profile associated with the earbud to determine a sound file. A generic or custom sound file can be selected to maximize loudness by playing a tone or pattern of tones at or near the resonant frequency of the loudspeaker (or the loudspeaker plus the speaker enclosure).

Process 600 can continue by optionally playing a prerecorded message on the earbud (604). For example, the message can broadcast warning that a loud sound is about to be played through the loudspeaker of the earbud. In an embodiment, the message can be spoken in a language that is used by Emily's smartphone. For example, a language profile stored on the smartphone can be used to determine the language for the message. The message can be streamed by the smartphone to the earbud over a direct or indirect communication link or the message can be stored in memory on the earbud and invoked by a signal or command from the smartphone or a server computer.

Process 600 can continue by optionally determining an in-ear detector (IED) status and display the status on a display of the smartphone (606). For example, at least one of an optical sensor, proximity sensor or biometric sensor in the earbud can detect when the earbud is placed in or proximate to a human ear. The IED status can be a message presented on the smartphone display so that Emily does not play a sound that could affect the hearing of a human ear. In an embodiment, if the IED status indicates an "in-ear" status, the smartphone can lock out the play sound feature automatically until the IED status changes to "not in-ear." The IED status can be encoded by one or more bits that are sent from the earbud to the smartphone via a direct or indirect communication link (e.g., included in a payload of a Bluetooth packet).

Process 600 can continue by playing a sound, or causing a sound to be played, through the loudspeaker of the earbud at increasingly higher levels of loudness up to a maximum loudness level, but not higher than a maximum loudness level allowed by government regulations (608). For example, the sound can include one or more tones or a pattern of tones at frequency that is at or near the resonant frequency of the loudspeaker. Alternatively, the sound can be played at a frequency that is above the range of human hearing (e.g., greater than 20.5 kHz) to ensure that the sound cannot affect the hearing of a human ear. The sound can be played through the loud speaker at low volume and then slowly ramp up in volume until the maximum loudness level of the device is reached or the maximum loudness level allowed by government regulation is reached, whichever level is lower. The sound can be streamed by the smartphone to the earbud, or the smartphone (or a server computer) can send a signal or command to the earbud to play the sound. In the latter case, the sound file can be stored in memory on the earbud, as described in reference to FIG. 13. For process 600, Emily can use her hearing to locate the earbud rather than using a sound locator GUI.

An advantage of process 600 is that the frequency at which the sound is played can be selected to be either close to the maximum sensitivity of the human ear (e.g., 3-4 kHz) and peak at or near the resonant frequency of the loudspeaker to efficiently provide maximize loudness, or the frequency can be selected to be above the maximum range of human hearing to protect the hearing.

Figure 7:
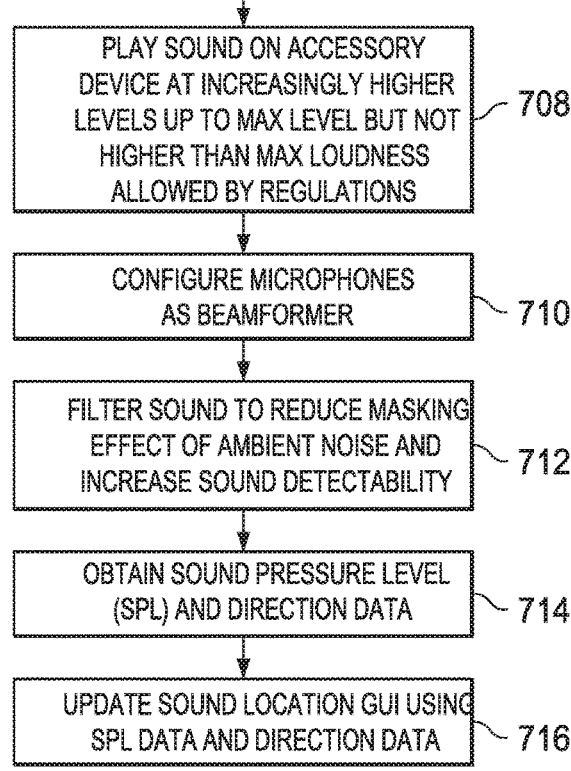
FIG. 7 is a flow diagram of a second process for locating a wireless accessory device, according to an embodiment.

FIG. 7 is a flow diagram of a second process 700 for locating a wireless accessory device, according to an embodiment. Process 700 can be implemented using, for example, the companion device architecture described in reference to FIG. 12.

Process 700 can begin by determining a sound file for Emily's earbud and a maximum loudness allowed by regulations (702), optionally playing a pre-recorded message through the loudspeaker of the earbud (704), optionally determining an IED status and displaying the status on the smartphone (706) and playing a sound, or causing a sound to be played, through the loudspeaker of the earbud at increasingly higher levels of loudness up to a maximum loudness level, but not higher than a maximum loudness level allowed by the government regulations (708). Accordingly, steps 702 through 708 of process 700 are the same as steps 602-608 of process 600, described in reference to FIG. 6, and therefore need not be described again.

Process 700 can continue by configuring two or more microphones of the smartphone for beamforming (710). Beamforming can be used to increase the SNR ratio of the detected sound signal by attenuating ambient noise outside the direction of interest. In an embodiment, two microphones located on a front or top edge of Emily's smartphone are configured to have a cardioid beam pattern such that the main lobe of the beam pattern is projected in front of Emily as she walks towards the sound source. Other directional beamforming patterns can also be employed.

Process 700 can continue by filtering the sound received from the environment to reduce the masking effect of ambient noise and to increase the detectability of the sound (712). In an embodiment, two consecutive narrow band-pass filters are applied to the sound to remove ambient noise to obtain a clear sound signal.

Process 700 can continue by obtaining normalized sound pressure values for a plurality of directions or headings (714). For example, a normalized $SPL_N$ value can be calculated for a given orientation (e.g., a given direction or compass heading) and stored on the smartphone using, for example, an array of 360 $SPL_N$ values that can be indexed using a heading, hash or other index. For example, there can be one normalized $SPL_N$ value for each degree in 360 degrees, as described in reference to FIG. 10D. For example, each time a new compass heading is detected the compass heading can be rounded to the nearest degree and used to index a corresponding position in the array. For example, if a compass heading of 35.6 degrees is detected, the compass heading would be rounded to 36 and used to access position 36 in the array. If the position is empty, then the normalized $SPL_N$ for the compass heading is stored at position 36 of the array. If the position is occupied with an old normalized $SPL_N$ value, then the old normalized $SPL_N$ value is replaced with the new normalized $SPL_N$ value at position 36 of the array.

Process 700 can continue by updating a sound locator GUI using the normalized $SPL_N$ values (716). For example, the height of $SPL_N$ bars can be determined by the new $SPL_N$ values, as described in reference to FIG. 10D.

Process 700 provides the same advantages as process 600, but also provides an additional advantage of using beamforming and band-pass filtering to increase signal detectability and therefore increase the likelihood of finding the lost earbud. Process 700 also has the added advantage of helping users with hearing impairment locate their lost accessory devices, since process 700 does not rely on the user's hearing to locate the accessory device. For example, if Emily is hearing impaired she could simply look at the sound locator GUI to determine a direction to walk in to find her lost earbud.

Figure 8:
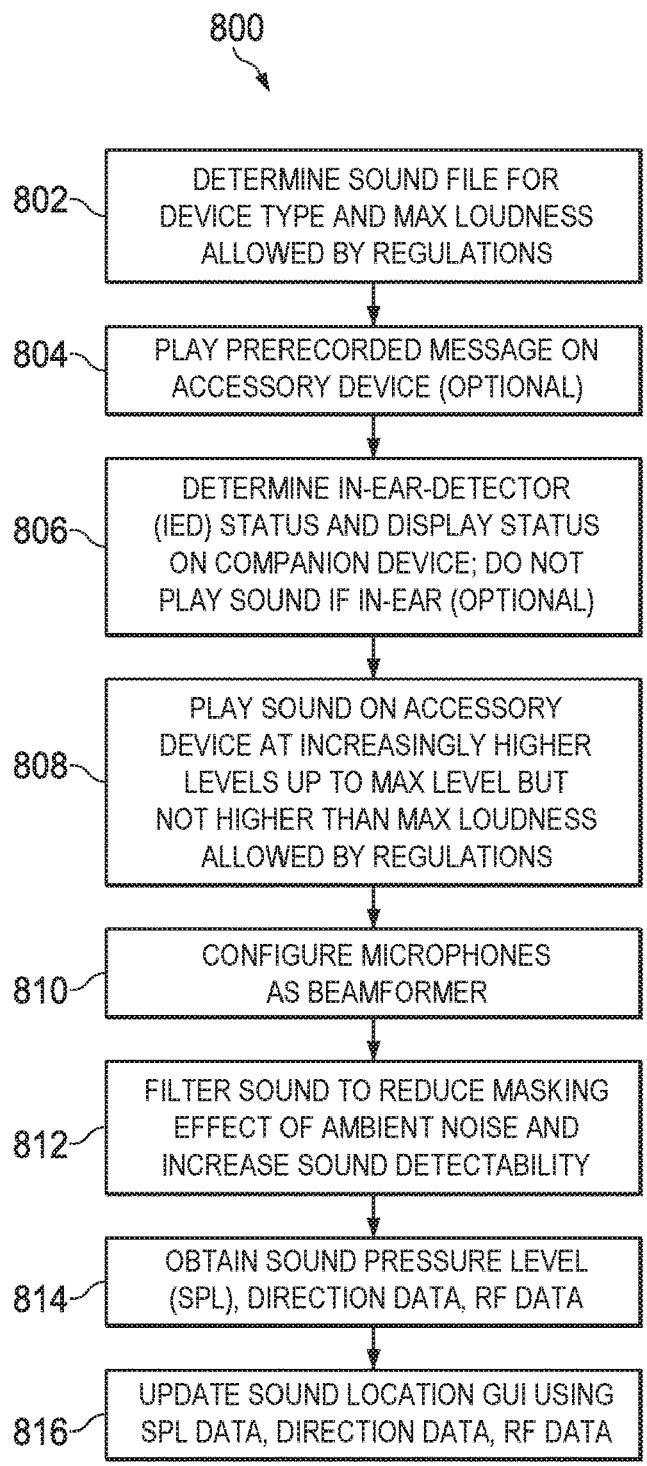
FIG. 8 is a flow diagram of a third process for locating a wireless accessory device, according to an embodiment.

FIG. 8 is a flow diagram of a third process for locating a wireless accessory device, according to an embodiment. Process 800 can be implemented using, for example, the companion device architecture described in reference to FIG. 12.

Process 800 can begin by determining a sound file for Emily's earbud and a maximum loudness allowed by regulations (802), optionally playing a pre-recorded message through the loudspeaker of the earbud (804), optionally determining an IED status and displaying the status on the smartphone (806) and playing a sound, or causing a sound to be played, through the loudspeaker of the earbud at increasingly higher levels of loudness up to a maximum loudness level, but not higher than a maximum loudness level allowed by the government regulations, configuring microphones of the smartphone for beamforming (810) and filtering the sound received from the environment to reduce the masking effect of ambient noise and to increase the detectability of the sound (812). Accordingly, steps 802 through 812 of process 800 are the same as steps 702-712 of process 700, described in reference to FIG. 7, and therefore need not be described again.

Process 800 can continue by obtaining $SPL_N$ values for a plurality of directions or headings and RF data (814). In an embodiment, range class estimates can be generated from RSSI values obtained from RF signals (e.g., Bluetooth signals) transmitted by the earbud. The range class can be displayed on the sound locator GUI on Emily's smartphone, as described in reference to FIG. 10D. In this example, the range class may be "In the House" since Emily is separated from the earbud by Room 3.

Process 800 can continue by updating the sound locator GUI using the normalized $SPL_N$ values and the RF data (816). For example, the RSSI values can be used to scale $SPL_N$ bar heights, as described by Equation [2].

Accordingly, process 800 provides the same advantages as processes 600 and 700, but also provides an additional advantage of using RF data to provide a range class estimation and to update the sound locator GUI.

Figure 9:
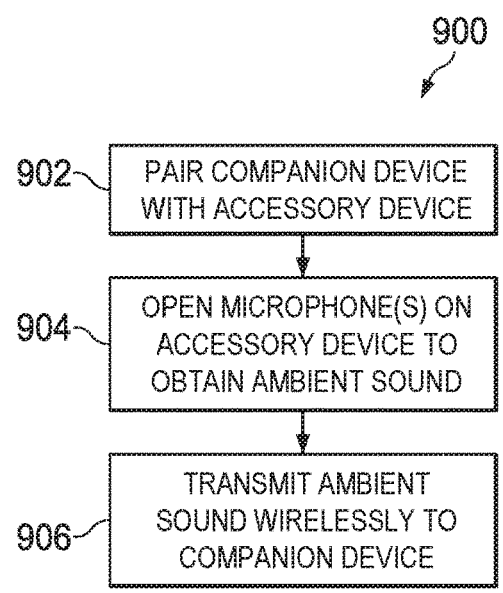
FIG. 9 is a flow diagram of a fourth process for locating a wireless accessory device, according to an embodiment.

FIG. 9 is a flow diagram of a fourth process for locating a wireless accessory device, according to an embodiment.

Figure 12:
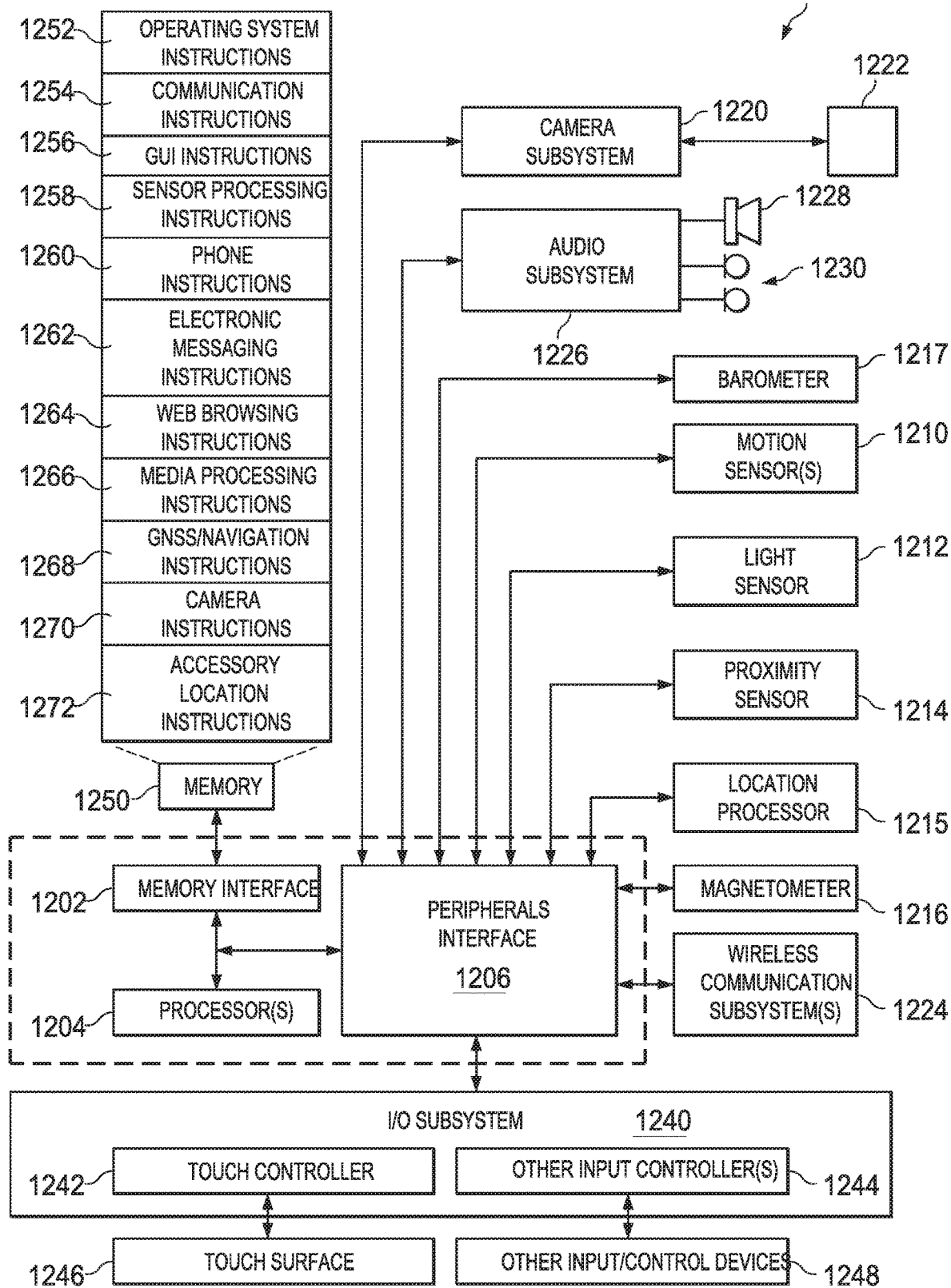
FIG. 12 is a companion device architecture, according to an embodiment.

Process 900 can be implemented using, for example, the companion device architecture described in reference to FIG. 12.

Process 900 can begin by pairing or otherwise establishing a direct or indirect communication link between Emily's smartphone and the earbud (902). Process 900 can continue by sending a signal or command to the earbud to open a microphone of the earbud (904), and then transmit wirelessly ambient sound captured by the microphone to the smartphone where it can be played through a loudspeaker or a headphone jack of the smartphone (906). Using the present example, after pairing the smartphone and earbud, Emily can use her smartphone to listen to the ambient sounds/noises captured by the earbud microphone and transmitted wirelessly to the smartphone. When Emily hears the ambient sound/noise, she may receive a clue on which room the earbud is located based on her knowledge of her house floorplan 500. For example, Emily would hear the sound of television 501 and determine that the earbud was in Room 2. Emily could then walk into Room 2 and invoke one of processes 600, 700 or 800 to locate the earbud in Room 2. To increase the likelihood of finding the lost earbud, process 900 can be combined with processes 700 or 800, to perform bi-directional transmissions between the smartphone and the earbud based on time multiplexing in the same communication session or communication channel. For example, in a sound playing mode, the sound is played by the earbud for a first period of time (e.g., 2-5 seconds). The smartphone is then placed in a listening mode for a second period of time (e.g., 2-5 seconds) where the ambient sound is captured and transmitted to the smartphone. To protect Emily's privacy or other family members while operating in listening mode, the smartphone can be configured to not persistently store or process the ambient sound captured by the earbud. In another embodiment, an audio message can be played on the earbud informing any individuals in earshot that there is a search for the location of the earbud underway. For example, the audio message could be: "Emily is searching for her lost earbud." The audio message could be time multiplexed with the listening mode.

Example Sound Locator GUIs

FIG. 10A illustrates a first GUI of companion device 1000 (a smartphone in this example) for locating a wireless device on a map, according to an embodiment. The first GUI includes map 1001 with marker 1002 designating a current or last known location of an accessory device. In the example shown, the last known location of Emily's lost earbud is indicated by marker 1002. Marker 1002 can be an icon, image, graphic or any other user interface element. Selectable cell 1003 can present a description/name of the lost device and an estimated distance between the accessory device and the current location of companion device 1000.

FIG. 10B illustrates a second GUI of companion device 1000 for locating a wireless accessory device and initiating a sound playing mode, according to an embodiment. In response to the user selecting cell 1003 (Emily's Earbud), the second GUI is presented which includes a zoomed view of map 1001 with marker 1002 centered in map 1001. Button 1004 can be selected by the user to play a sound on the earbud, as described in reference to FIGS. 1-9. In this example, the Emily presses button 1104.

FIG. 10C illustrates a third GUI of companion device 1000 for locating a wireless accessory device including a feature for independently muting left and right loudspeakers of the accessory device, according to an embodiment. Responsive to selection of button 1004, an image 1005 of the left and right earbuds are displayed. Buttons 1006a, 1006b are also displayed to allow the user to mute independently the left and right earbuds. This feature comes in handy in the instance case where only one earbud is lost or stolen. Button 1007 allows Emily to stop playing the sound.

FIG. 10D illustrates a sound locator GUI of companion device 1000 for locating a wireless accessory device, according to an embodiment. The sound locator GUI includes a graphical element 1008 comprising a rotatable portion (e.g., a two-dimensional (2D) rotatable circular plate) with direction indicators 1009a, 1009b and $SPL_N$ bars 1010. The direction indicators 1009a (an arrow) and 1009b (a beam or cone) indicate the current pointing direction (+X axis in this example) of companion device 1000. A proximity indicator 1111 (e.g., "Nearby" in this example) is presented in the center of the rotatable graphical element to present to the user an estimate of their proximity to the accessory device. $SPL_N$ bars 1010 extend radially along the perimeter of the rotatable portion. The height of each $SPL_N$ bar is scaled to indicate the SPL value in a corresponding orientation of companion device 1000 in a reference coordinate system (e.g., a local level or geodetic coordinate frame). An example reference coordinate system is the East, North, Up (ENU) Cartesian coordinate system or Earth-Centered, Earth-Fixed (ECEF) Cartesian coordinate system. In an embodiment, the orientation can be represented by a direction indicating graphical element (e.g., a compass heading arrow) in the range of 00 to 360°.

In an embodiment, as Emily moves around and walks towards the ear bud (the sound source), the sound locator GUI is updated with new $SPL_N$ values and for the new headings. Emily need not rotate a full range of 0° to 360° to begin the sound location process. If Emily knows the general location of the sound, Emily can scan the local environment using a left to right motion of her arm to generate or update $SPL_N$ bars for various compass headings. The higher the bars the higher the normalized $SPL_N$ for that heading. In the example shown, the $SPL_N$ bars at about 45 degrees from Emily's current heading are higher than other $SPL_N$ bars indicating to Emily that she should walk in the direction indicated by the highest $SPL_N$ bars. By contrast, there are no bars shown on the opposite side of the virtual compass. Thus, the bars location on the virtual compass and the height of the $SPL_N$ bars provide visual feedback to Emily on the direction of the sound source. The use of visual feedback is helpful to users with hearing impairment or in environments with high ambient noise. In an embodiment, an audio subsystem of the companion device can provide audio feedback that indicates a distance or proximity to the sound source in addition to or in place of the visual feedback. In an embodiment, a haptic engine in the companion device can provide haptic feedback (e.g., a vibration or vibration pattern) that indicates proximity or distance to the sound source in addition to or in place of the visual feedback and/or audio feedback. For example, as Emily gets closer to the sound source, a frequency of a vibration pattern can increase or the cadence of the pattern can change. In an embodiment, the rotatable portion of the graphical element can be a three-dimensional (3D) object projected in the GUI.

In an embodiment, when graphical element 1008 is refreshed, the height of each $SPL_N$ bar for a given orientation (each degree in the range of 0° to 360°) is calculated using Equations [2] and [3]:

$$barHeight = \qquad [2]$$
$$\text{MAX}\left(\left(\log f(\text{volume} * \text{factor}) * \left(\frac{100}{\text{proximity}}\right)\right), \text{minBarHeight}\right),$$

$$barHeight = \text{MIN}(barHeight, maxBarHeight), \qquad [3]$$

where volume is the normalized $SPL_N$ value for the given orientation (e.g., heading), proximity is an average of RSSI values (or a range estimated from an average of RSSI values using a radio wave distance formula or propagation model to the accessory device computed from RSSI values), minBarHeight is a minimum bar height to ensure that the $SPL_N$ bar is visible in the GUI, maxBarHeight is a maximum bar height to ensure the $SPL_N$ bar does not extend to far, the MAX( ) function compares its two input values and returns the larger of two input values, the MIN( ) function compares its two input values and returns the smaller of the two input values, log f( ) is logarithmic fit function that fits the $SPL_N$ values to a logarithmic curve and factor is a constant (e.g., 40) used to scale volume prior to computing the log function log/). Other values of factor could also be used (e.g., 10).

FIG. 10E illustrates a fifth GUI of a companion device 1000 for locating a wireless accessory device, including a sound GUI with the beamformer of the companion device oriented in the opposite direction of the wireless accessory device, according to an embodiment. The sound measurement GUI includes an $SPL_N$ value 1011a that is numerically displayed on the screen (e.g., as text) and a bar 1012a (e.g., a digital or analog sound pressure meter) showing graphically the $SPL_N$ value.

Figure 10F:
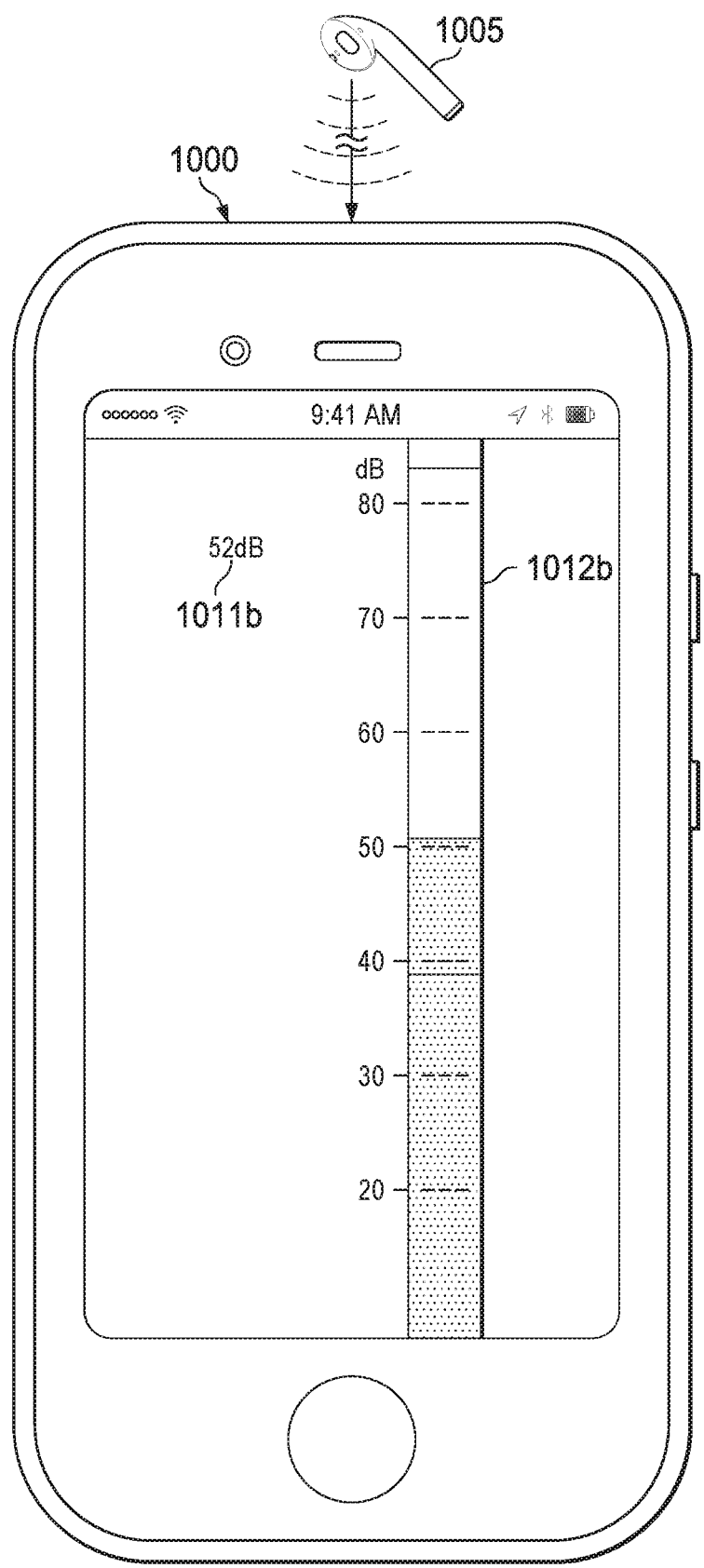
FIG. 10F illustrates a sixth GUI of a companion device for locating a wireless accessory device, including a sound GUI with the beamformer of the companion device oriented in the direction of the wireless accessory device, according to an embodiment.

FIG. 10F illustrates a sixth GUI of a companion device for locating a wireless accessory device, including a sound GUI with the beamformer of the companion device oriented in the direction of the wireless accessory device, according to an embodiment. The sound measurement GUI includes an $SPL_N$ value 1011b that is numerically displayed on the screen (e.g., as text) and a bar 1012b (e.g., a digital or analog sound pressure meter) showing graphically the $SPL_N$ value.

Example Case for Storing Wireless Accessory Device

In an embodiment, the wireless accessory device may be stored in a case. If the case is lost, then a sound played through a loudspeaker of the wireless accessory device may be inaudible when stored in the case. To address this problem, the case itself can include a loudspeaker and/or vibrator, a microprocessor, memory and a wireless transceiver. The wireless transceiver can be a Bluetooth (BT) wireless transceiver chip or a hybrid BT/WiFi wireless transceiver chip that can handle both BT and WiFi protocols. The case can also include a charge connector for charging the wireless accessory device and a power source (e.g., a rechargeable battery) to power the electronics and wireless accessory device. The case can include one or more holes to allow sound from the loudspeaker out of the case. In an embodiment, the one or more holes can be water-proofed using for example, rubber gaskets.

In an embodiment, the microprocessor can detect when the case is opened or closed and whether the wireless accessory device is stored in the case. For example, the case can include a hinged-lid portion that is configured to provide a signal to the microprocessor when opened or closed using, for example, metal contacts or proximity switches. Similarly, when the wireless accessory device is coupled to the charging connector, the charge connector can be configured to send a signal to the microprocessor, which can be used to indicate that the wireless accessory device is charging in the case. The microprocessor can then store data (e.g., a binary code) in local memory that indicates the operating status of the case. Timestamps indicating times of connection and disconnection of the wireless accessory device to/from the charge connector can also be stored to assist in recovery of the wireless accessory device, as described below.

If the user loses their case, the user can use the processes previously described above to find their lost case. This includes, for example, playing a sound and using a sound locator GUI of a companion device to navigate to the lost case, as described in reference to FIGS. 10A-10F. In an embodiment, the companion device (e.g., a smartphone, table computer, wearable computer) can send a read request to the case over a bi-directional wireless communication link (e.g., BT or WiFi) to read the operating state of the case from local memory. The read request can cause the microprocessor to read from local memory one or more status codes and send the one or more status codes to the wireless transceiver chip for transmission to the companion device. In an embodiment, the one or more status codes can indicate: 1) whether or not the wireless accessory device is currently charging in the case; 2) whether the case is open or closed; and 3) the remaining battery life.

In an example use scenario, the one or more status codes can be used by the companion device to determine whether to play a sound through the wireless accessory device loudspeaker or the case loudspeaker. For example, if a status code indicates that the wireless accessory device is charging in the case and the case is open, then a sound can be played from the loudspeaker of the wireless accessory device. If, however, the case is closed then a loudspeaker of the case can be used to play the sound. If the case has a vibrator, the companion device can command the vibrator to start vibrating, which may provide an audible sound that can be heard by the user and used to locate the case. If the status code indicates that the battery life in the case is low, then that status could be used as a factor for playing a sound through the loudspeaker of the wireless accessory device rather than the loudspeaker/vibrator of the case.

In an embodiment where the case includes a hybrid BT/WiFi chip, the location of the case may be estimated using WiFi positioning and stored in local memory. When the wireless accessory device is disconnected from the charging connector, the last known location of the wireless accessory device (as determined using WiFi positioning) is stored in local memory with a timestamp and displayed on a companion device upon request by the user. The user can then search for the lost wireless accessory device at the last known location of the case where the user presumably removed the wireless accessory device from the case.

Example Server Architecture

Figure 11:
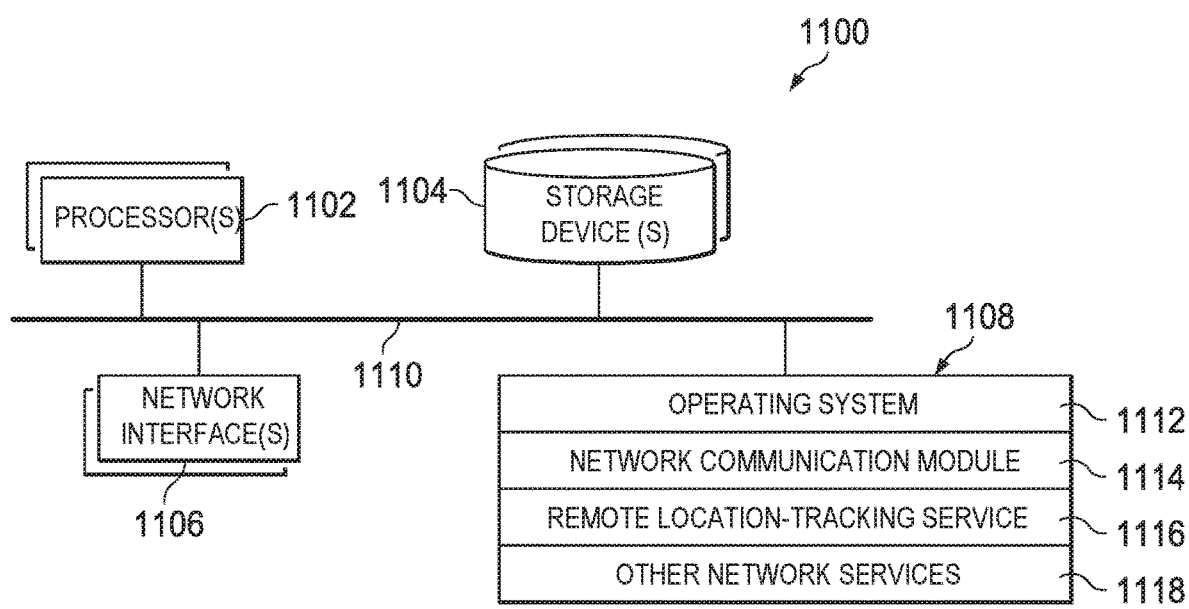
FIG. 11 is a server computer architecture, according to an embodiment.

FIG. 11 is a block diagram of example server architecture for implementing the features and processes described in reference to FIGS. 1-10, according to an embodiment. Other architectures are possible, including architectures with more or fewer components. In some implementations, architecture 1100 includes one or more processor(s) 1102 (e.g., dual-core Intel® Xeon® Processors), one or more network interface(s) 1106, one or more storage device(s) 1104 (e.g., hard disk, optical disk, flash memory) and one or more computer-readable medium(s) 1108 (e.g., hard disk, optical disk, flash memory, etc.). These components can exchange communications and data over one or more communication channel(s) 1110 (e.g., buses), which can utilize various hardware and software for facilitating the transfer of data and control signals between components.

The term "computer-readable medium" refers to any medium that participates in providing instructions to processor(s) 1102 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 1108 can further include operating system 1112 (e.g., Mac OS® server, Windows® NT server), network communication module 1114, remote location-tracking service 1116 and other services 1118.

Operating system 1112 can be multi-user, multiprocessing, multitasking, multithreading, real time, etc. Operating system 1112 performs basic tasks, including but not limited to: recognizing input from and providing output to devices 1102, 1104, 1106 and 1108; keeping track and managing files and directories on computer-readable medium(s) 1108 (e.g., memory or a storage device); controlling peripheral devices; and managing traffic on the one or more communication channel(s) 1110. Network communications module 1114 includes various components for establishing and maintaining network connections (e.g., software for implementing communication protocols, such as TCP/IP, HTTP, etc.).

In an embodiment, remote-tracking service 1116 implements a website that allows a user of a requesting device to configure a lost mode on a wireless device, as described in reference to FIG. 1. Service 1116 can also perform a remote wipe of a companion device (erase its contents), track histories of companion and accessory devices and play sounds through companion and accessory devices. Other network services 1118 can include but are not limited to: map and navigation services, location-based services, device registration/authentication and user account administration.

Architecture 1100 can be included in any computer device, including one or more server computers in a local or distributed network each having one or more processing cores. Architecture 1100 can be implemented in a parallel processing or peer-to-peer infrastructure or on a single device with one or more processors. Software can include multiple software components or can be a single body of code.

Example Companion Device Architecture

FIG. 12 is a block diagram of example companion device architecture 1200 for implementing the features and processes described in reference to FIGS. 1-10. Architecture 1200 may be implemented in any electronic device for generating the features and processes described in reference to FIGS. 1-3, including but not limited to smart phones, tablet computers and wearable computers (e.g., smart watches, fitness bands). Architecture 1200 may include memory interface 1202, data processor(s), image processor(s) or central processing unit(s) 1204, and peripherals interface 1206. Memory interface 1202, processor(s) 1204 or peripherals interface 1206 may be separate components or may be integrated in one or more integrated circuits. One or more communication buses or signal lines may couple the various components.

Sensors, devices, and subsystems may be coupled to peripherals interface 1206 to facilitate multiple functionalities. For example, motion sensor(s) 1210, light sensor 1212, and proximity sensor 1214 may be coupled to peripherals interface 1206 to facilitate orientation, lighting, and proximity functions of the mobile device. For example, in some implementations, light sensor 1212 may be utilized to facilitate adjusting the brightness of touch surface 1246. In some implementations, motion sensor(s) 1210 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 1206, such as a temperature sensor, a barometer, a biometric sensor or other sensing device, to facilitate related functionalities. For example, a biometric sensor can detect fingerprints and monitor heart rate and other fitness parameters. In an embodiment, a haptic motor (not shown) can be coupled to the peripheral interface, which can provide vibration patterns as haptic feedback.

Location processor 1215 (e.g., GNSS receiver chip) may be connected to peripherals interface 1206 to provide georeferencing. Electronic magnetometer 1216 (e.g., an integrated circuit chip) may also be connected to peripherals interface 1206 to provide data that may be used to determine the direction of magnetic North. Thus, electronic magnetometer 1216 may be used as an electronic compass.

Camera subsystem 1220 and an optical sensor 1222, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 1224. Communication subsystem(s) 1224 may include one or more wireless communication subsystems. Wireless communication subsystems 1224 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 1224 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 1224 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 1226 may be coupled to a speaker 1228 and one or more microphones 1230 to facilitate voice-enabled functions, such as voice recognition, voice replication, digital recording, telephony functions and for receiving sound signals from an accessory device, as described in reference to FIGS. 1-10.

I/O subsystem 1240 may include touch controller 1242 and/or another input controller(s) 1244. Touch controller 1242 may be coupled to a touch surface 1246. Touch surface 1246 and touch controller 1242 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 1246. In one implementation, touch surface 1246 may display virtual or soft buttons and a virtual keyboard, which may be used as an input/output device by the user.

Other input controller(s) 1244 may be coupled to other input/control devices 1248, such as one or more buttons, rocker switches, thumb-wheel, infrared port, USB port, and/or a pointer device such as a stylus. The one or more buttons (not shown) may include an up/down button for volume control of speaker 1228 and/or microphone 1230.

In some implementations, device 1200 may present recorded audio and/or video files, such as MP3, AAC, and MPEG video files. In some implementations, device 1200 may include the functionality of an MP3 player and may include a pin connector for tethering to other devices. Other input/output and control devices may be used. In an embodiment, device 1200 may include an audio processing unit for streaming audio to an accessory device over a direct or indirect communication link, as described in reference to FIGS. 1-10.

Memory interface 1202 may be coupled to memory 1250. Memory 1250 may include high-speed random access memory or non-volatile memory, such as one or more magnetic disk storage devices, one or more optical storage devices, or flash memory (e.g., NAND, NOR). Memory 1250 may store operating system 1252, such as Darwin, RTXC, LINUX, UNIX, OS X, iOS, WINDOWS, or an embedded operating system such as VxWorks. Operating system 1252 may include instructions for handling basic system services and for performing hardware dependent tasks. In some implementations, operating system 1252 may include a kernel (e.g., UNIX kernel).

Memory 1250 may also store communication instructions 1254 to facilitate communicating with one or more additional devices, one or more computers or servers, including peer-to-peer communications with wireless accessory devices, as described in reference to FIGS. 1-10. Communication instructions 1254 may also be used to select an operational mode or communication medium for use by the device, based on a geographic location (obtained by the GPS/Navigation instructions 1268) of the device.

Memory 1250 may include graphical user interface instructions 1256 to facilitate graphic user interface processing, including a touch model for interpreting touch inputs and gestures; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/Navigation instructions 1268 to facilitate GPS and navigation-related processes; camera instructions 1270 to facilitate camera-related processes and functions; and accessory location instructions 1272 for locating accessory devices, as described in reference to FIGS. 1-10. The GPS/Navigation instructions 1268 include instructions for estimating location, including but not limited to an extended Kalman filter and other processes for estimating location.

Each of the above identified instructions and applications may correspond to a set of instructions for performing one or more functions described above. These instructions need not be implemented as separate software programs, procedures, or modules. Memory 1250 may include additional instructions or fewer instructions. Furthermore, various functions of the device may be implemented in hardware and/or in software, including in one or more signal processing and/or application specific integrated circuits (ASICs).

Example Accessory Device Architecture

Figure 13:
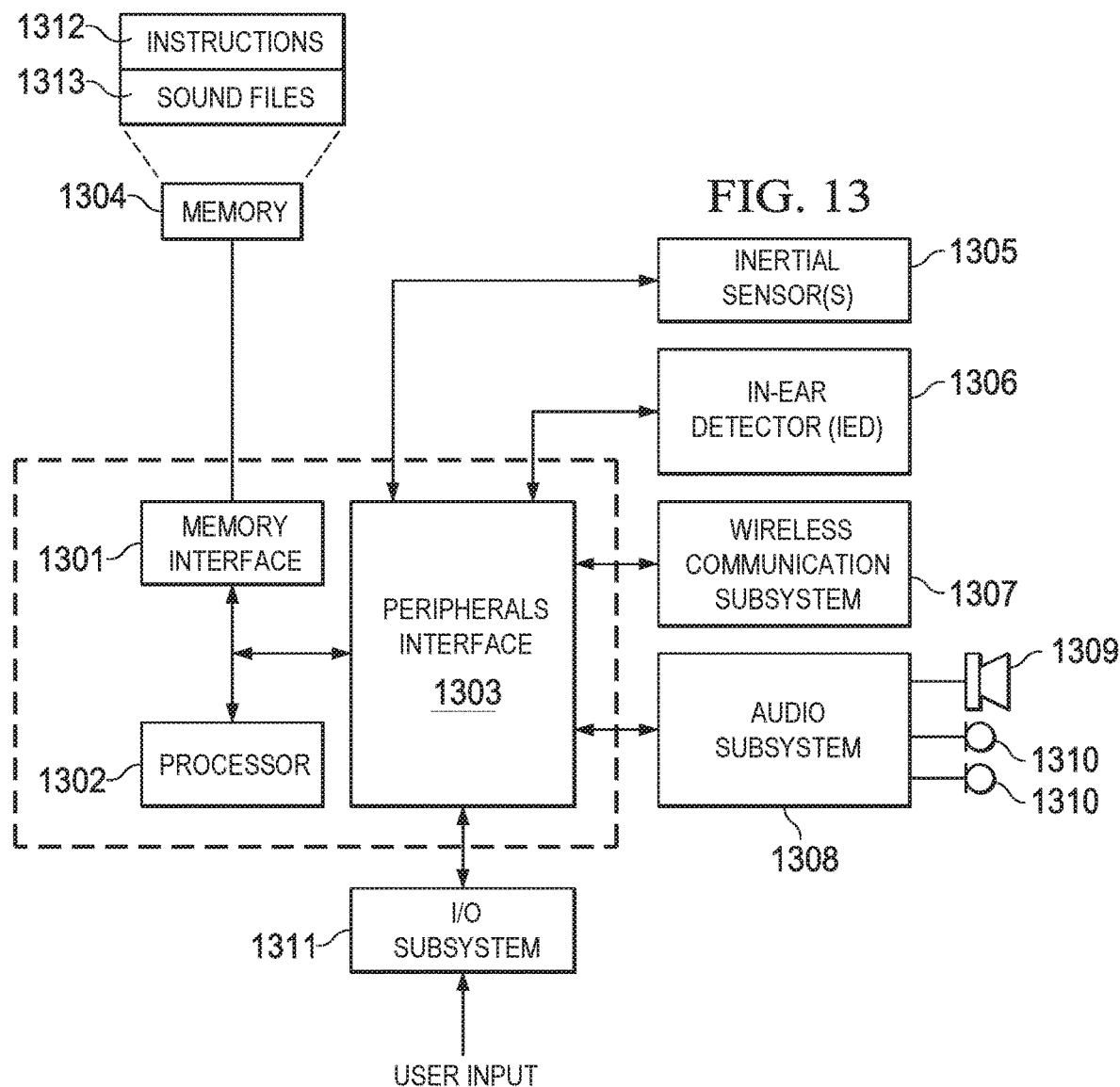
FIG. 13 is a wireless accessory device architecture, according to an embodiment.

FIG. 13 is a wireless accessory device architecture, according to an embodiment. Architecture 1300 includes memory interface 1301, processor 1302, peripherals interface 1303, memory 1304, one or more inertial sensors 1305, LED 1306, wireless communication subsystem 1307, audio subsystem 1308, one or more speakers 1309, one or more microphones 1310 and input/output (I/O) subsystem 1311. Memory further includes instructions 1312 and sound file(s) 1313. Memory interface 1301, processor 1302 and/or peripherals interface 1303 may be separate components or may be integrated in one or more integrated circuits. Other accessory devices, such as smartwatches may include an on-wrist detector (OWD) (that uses an optical or proximity sensor, for example) instead of an IED. One or more communication buses or signal lines may couple the various components.

Sensors, devices, and subsystems may be coupled to peripherals interface 1303 to facilitate multiple functionalities. For example, inertial sensor(s) 1305 and IED 1306 may be coupled to peripherals interface 1303 to facilitate orientation and proximity functions of the accessory device. In some implementations, inertial sensors 1305 (e.g., an accelerometer, rate gyroscope) may be utilized to detect movement and orientation of the accessory device. For example, if the accessory device is an ear bud, headphone or headset, a multi-axis accelerometer can be used to identify head gestures. Also, the accelerometer can be configured to detect vibrations due to user input (e.g., tapping on the accessory device) to activate or deactivate the accessory device or perform another function. Other sensors may also be connected to peripheral interfaced 1303, such as a magnetometer, temperature sensor, a barometer or a biometric sensor to facilitate related functionalities. For example, a biometric sensor can be used for authentication and/or to monitor heart rate and/or other fitness parameters. IED 1307 can include an optical sensor, proximity switch, biometric sensor or any other suitable sensor for detecting when the accessory device is placed in or proximate to a user's ear.

Communication functions may be facilitated through wireless communication subsystem 1307. Wireless communication subsystem 1307 may include a RF transceiver for short range, peer-to-peer communication with a companion device as described in reference to FIGS. 1-10. The specific design and implementation of the wireless communication subsystem 1307 may depend on the communication network(s) or medium(s) over which the device is intended to operate. For example, the wireless communication subsystem 1307 may facilitate communication over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystem 1307 may include a software stack for implementing wireless communication protocols.

Audio subsystem 1308 may be coupled to one or more loudspeakers 1309 and one or more microphones 1311 to facilitate voice-enabled functions, such as voice recognition, voice replication, digital recording, and telephony functions, and to perform processes an enable features as described in reference to FIGS. 1-10.

I/O subsystem 1311 may include a touch controller and/or another input controller. The touch controller may be coupled to a touch surface. The touch surface and touch controller may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface. Other input controllers may be coupled to other input/control devices, such as one or more buttons, rocker switches or thumb-wheel. The one or more buttons may include an up/down button for volume control of speaker(s) 1309 and/or microphones 1311. In some implementations, the accessory device may play recorded audio files (e.g., sound files or audio messages), such as MP3, AAC, and MPEG video files. In some implementations, the accessory device may include the functionality of an audio player (e.g., MP3 player).

Memory interface 1301 may be coupled to memory 1304. Memory 1304 may include high-speed random access memory or non-volatile memory, such as one or more magnetic disk storage devices, one or more optical storage devices, or flash memory (e.g., NAND, NOR). Memory 1304 may store instructions 1312 and sound file(s) 1313. Instructions can include operating system instructions for handling basic system services and for performing hardware dependent tasks. Instructions 1312 can facilitate communicating with one or more additional devices, one or more computers or servers, including peer-to-peer communications with a companion device as described in reference to FIGS. 1-10. Instructions 1312 can facilitate GUI processing, inertial sensor processing and IED processing. Instructions 1312 can respond to signals or commands from a companion device to play sound file 1313 with increasing levels of loudness to a maximum loudness but not exceeding a maximum loudness allowed by government regulations. Memory 1304 may include additional instructions or fewer instructions. The various functions of the accessory device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by an electronic device, comprising:
    playing, or initiating the playing of, a sound through a loudspeaker of an accessory device located in an environment, wherein the accessory device is communicatively coupled to the electronic device through a communication link, wherein the sound is played at a specified frequency or frequencies that utilizes a resonant frequency response of the loudspeaker of the accessory device, and wherein the sound is played through the loudspeaker of the accessory device at increasing levels of loudness until a maximum loudness is reached;
    receiving, by two or more microphones of the electronic device, a recording of the environment, the recording including the sound played through the loudspeaker of the accessory device and ambient noise;
    filtering, by one or more filters of the electronic device, the recording, the one or more filters configured to pass the sound played through the loudspeaker of the accessory device and to reduce masking of the sound by the ambient noise;
    determining, by the electronic device, a pressure level of the passed sound; and
    associating, by the electronic device, the pressure level of the passed sound with an orientation of the electronic device in a reference coordinate system, the orientation of the electronic device determined from sensor data provided by one or more inertial sensors of the electronic device.

2. The method of claim 1, wherein the orientation is a compass heading calculated from sensor data provided by the one or more inertial sensors.

3. The method of claim 2, further comprising:
    calculating a normalized sound pressure level value from the passed sound;
    causing a graphical user interface to be displayed on the electronic device that includes a graphical element that associates the normalized sound pressure level with the orientation of the electronic device in a reference coordinate system.

4. The method of claim 3, wherein the graphical element further comprises:
    a rotatable portion including at least one direction indicator, the rotatable portion operable to rotate when the electronic device is rotated, such that the orientation of the electronic device is indicated by the at least one direction indicator; and
    one or more bars indicating normalized sound pressure levels protruding radially from the perimeter of the rotatable graphical element.

5. The method of claim 1, wherein the maximum loudness is defined by government regulations.

6. The method of claim 1, wherein the sound is played at a frequency that is higher than the maximum human hearing range.

7. The method of claim 1, where the accessory device is an earbud, headphone or headset, and the method further comprises:
    obtaining, by the electronic device from the accessory device, an in-ear detector (IED) status indicating that the accessory device is located in, or is proximate to, a human ear.

8. The method of claim 1, where the accessory device is an earbud, headphone or headset, and the method further comprises:

prior to playing the sound through the loudspeaker of the accessory device, playing a prerecorded audio message through the loudspeaker of the accessory device, the prerecorded audio message warning that sound is about to be played through the loudspeaker.

9. The method of claim 1, wherein the sound is streamed by the electronic device to the accessory device over the communication link.

10. The method of claim 1, wherein the sound played through the loudspeaker of the accessory device is generated by the accessory device using a sound file stored on the accessory device in response to a signal or command provided by the electronic device over the communication link.

11. The method of claim 1, further comprising:
commanding or signaling, by the electronic device, the accessory device to open one or more accessory microphones; and
obtaining, from the accessory device and through the communication link, data representing ambient sound captured by the one or more accessory microphones at location of the accessory device in the environment, where the ambient sound is obtained by the electronic device at a different time than the recording is received by the electronic device.

12. The method of claim 1, wherein the accessory device is an earbud, headphone or headset, and the loudspeaker is a left or right loudspeaker, and the method further comprises:
receiving, through a graphical user interface displayed by the electronic device, input selecting the left or right loudspeaker; and
responsive to the input, muting the selected loudspeaker.

13. The method of claim 1, further comprising:
establishing, by the electronic device, communication with a server computer;
receiving, by the electronic device from the server computer, a sound file for the sound to be played on the accessory device.

14. The method of claim 1, wherein filtering the recording comprises applying a band-pass filter centered at a resonant frequency or frequencies of the loudspeaker.

15. A system comprising:
two or more microphones;
one or more processors;
memory operable to store instructions, which, when executed by the one or more processors, causes the one or more processors to perform operations comprising:
playing, or initiating the playing of, a sound through a loudspeaker of an accessory device located in an environment, wherein the sound is played at a specified frequency or frequencies that utilize a resonant frequency response of the loudspeaker, wherein the sound is played through the loudspeaker of the accessory device at increasing levels of loudness until a maximum loudness is reached;
receiving, by the two or more microphones, a recording of the environment, the recording including the sound played through the loudspeaker of the accessory device and ambient noise;
filtering, by one or more filters, the recording, the one or more filters configured to pass the sound played through the loudspeaker of the accessory device and to reduce masking of the sound by the ambient noise; and
associating a pressure level of the passed sound with an orientation of an electronic device in a reference coordinate system, the orientation of the electronic device determined from sensor data provided by one or more inertial sensors of the electronic device.

16. The system of claim 15, further comprising:
calculating a normalized sound pressure level value from the passed sound;
causing a graphical user interface to be displayed on the electronic device that includes a graphical element that associates the normalized sound pressure level with the orientation of the electronic device in a reference coordinate system.

17. A non-transitory, computer-readable storage medium having instructions stored thereon, which, when executed by one or more processors of an electronic device, causes the one or more processors to perform operations comprising:
playing, or initiating the playing of, a sound through a loudspeaker of an accessory device located in an environment, wherein the accessory device is communicatively coupled to the electronic device through a communication link, wherein the sound is played at a specified frequency or frequencies that utilize a resonant frequency response of the loudspeaker of the accessory device, and wherein the sound is played through the loudspeaker of the accessory device at increasing levels of loudness until a maximum loudness is reached;
receiving, by two or more microphones of the electronic device, a recording of the environment, the recording including the sound played through the loudspeaker of the accessory device and ambient noise;
filtering, by one or more filters of the electronic device, the record, the one or more filters configured to pass the sound played through the loudspeaker of the accessory device and to reduce masking of the sound by the ambient noise;
determining, by the electronic device, a pressure level of the passed sound; and
associating, by the electronic device, the pressure level of the passed sound with an orientation of the electronic device in a reference coordinate system, the orientation of the electronic device determined from sensor data provided by one or more inertial sensors of the electronic device.

18. The non-transitory, computer-readable storage medium of claim 17, further comprising:
calculating a normalized sound pressure level value from the passed sound;
causing a graphical user interface to be displayed on the electronic device that includes a graphical element that associates the normalized sound pressure level with the orientation of the electronic device in a reference coordinate system.

19. An electronic device comprising:
two or more microphones;
one or more inertial sensors;
a wireless communications interface;
one or more processors;
memory operable to store instructions, which, when executed by the one or more processors, causes the one or more processors to perform operations comprising:
playing, or initiating the playing of, a sound through a loudspeaker of an accessory device located in an environment, wherein the accessory device is communicatively coupled to the electronic device through the wireless communication interface, wherein the sound is played at a specified frequency or frequencies that utilize a resonant frequency response of the loudspeaker, and wherein the sound is played through the loudspeaker of the accessory device at increasing levels of loudness until a maximum loudness is reached;

receiving, by the two or more microphones, a recording of the environment, the recording including the sound played through the loudspeaker of the accessory device and ambient noise;

filtering, by one or more filters, the recording, the one or more filters configured to pass the sound played through the loudspeaker of the accessory device and to reduce masking of the sound by the ambient noise; and determining a pressure level of the passed sound;

associating the pressure level of the passed sound with an orientation of the electronic device in a reference coordinate system, the orientation of the electronic device determined from sensor data provided by the one or more inertial sensors.

20. The electronic device of claim 19, further comprising:

calculating a normalized sound pressure level value from the passed sound;

causing a graphical user interface to be displayed on the electronic device that includes a graphical element that associates the normalized sound pressure level with the orientation of the electronic device in a reference coordinate system.

\* \* \* \* \*